US011461942B2

(12) United States Patent
Stokking et al.

(10) Patent No.: US 11,461,942 B2
(45) Date of Patent: Oct. 4, 2022

(54) GENERATING AND SIGNALING TRANSITION BETWEEN PANORAMIC IMAGES

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Hans Maarten Stokking, Wateringen (NL); Hendrikus Nathaniël Hindriks, The Hague (NL); Mattijs Oskar van Deventer, Leidschendam (NL); Johannes Marinus Maria de Nijs, Rijswijk (NL); Karim Mohammed el Assal, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/712,736

(22) Filed: Dec. 12, 2019

(65) Prior Publication Data

US 2020/0202597 A1   Jun. 25, 2020

(30) Foreign Application Priority Data

Dec. 21, 2018  (EP) .................................. 18215479

(51) Int. Cl.
*G06T 11/60* (2006.01)
*G06T 7/70* (2017.01)
*G06T 13/80* (2011.01)

(52) U.S. Cl.
CPC ................ *G06T 11/60* (2013.01); *G06T 7/70* (2017.01); *G06T 13/80* (2013.01); *G06T 2207/30241* (2013.01)

(58) Field of Classification Search
CPC . G06T 11/60; G06T 7/70; G06T 13/80; G06T 2207/30241; G06T 15/20;
(Continued)

(56) References Cited

U.S. PATENT DOCUMENTS 7,990,394 B2   8/2011   Vincent et al.
9,196,072 B2   11/2015  Oh et al.
(Continued)

FOREIGN PATENT DOCUMENTS

CN   105681776 A   6/2016
EP   1 496 476 A1   12/2005

OTHER PUBLICATIONS

Schleimer, S., et al., "Squares that Look Round: Transforming Spherical Images," *Mathematics Institute/University of Warwick; Department of Mathematics/Oklahoma State University*, May 4, 2016 (10 pages).
(Continued)

*Primary Examiner* — Chante E Harrison
(74) *Attorney, Agent, or Firm* — Hamilton, Brook, Smith & Reynolds, P.C.

(57) ABSTRACT

Processor systems and computer-implemented methods are provided for rendering a multiuser virtual environment in which different panoramic images are provided as image-based backdrop for different viewing positions in the virtual environment. When a user switches from a first viewing position for which a first panoramic image is rendered to a second viewing position for which a second panoramic image is rendered, a transition may be rendered for the user, for example as a mathematical transformation of the pan-
(Continued)

oramic images. To avoid other users perceiving the representation of the user in the virtual environment from abruptly switching to the second viewing position, transition data may be provided which enables another processor system to render a representation of the transition in the virtual environment, e.g., by moving an avatar of the user along a movement trajectory.

15 Claims, 15 Drawing Sheets

(58) Field of Classification Search
CPC ... G06T 19/003; G06T 19/006; H04N 13/332; H04N 13/366; H04N 13/398
See application file for complete search history.

(56) References Cited

U.S. PATENT DOCUMENTS

| | | | |
|---|---|---|---|
| 9,401,044 B1* | 7/2016 | Kaufman | G06T 15/04 |
| 9,721,393 B1* | 8/2017 | Dunn | G09G 5/005 |
| 10,848,738 B1* | 11/2020 | Petrangeli | H04N 13/366 |
| 10,969,876 B1* | 4/2021 | Michaels | G06F 3/04883 |
| 11,190,680 B1* | 11/2021 | Tran | G11B 27/005 |
| 2003/0090496 A1 | 5/2003 | Cahill et al. | |
| 2003/0234859 A1 | 12/2003 | Malzbender et al. | |
| 2006/0132482 A1 | 6/2006 | Oh | |
| 2013/0201214 A1 | 8/2013 | Piippo et al. | |
| 2013/0215115 A1* | 8/2013 | Jenkins | G06T 15/20 345/420 |
| 2014/0002439 A1* | 1/2014 | Lynch | G06T 3/4053 345/419 |
| 2017/0019655 A1 | 1/2017 | Mueller et al. | |
| 2018/0143023 A1* | 5/2018 | Bjorke | G06T 19/003 |
| 2018/0143756 A1* | 5/2018 | Mildrew | G06F 3/0482 |
| 2018/0150989 A1* | 5/2018 | Mitsui | H04N 5/232935 |
| 2018/0255290 A1* | 9/2018 | Holzer | H04N 13/221 |
| 2018/0373413 A1* | 12/2018 | Sawaki | H04N 13/332 |
| 2019/0102940 A1* | 4/2019 | Nakao | H04N 5/23218 |
| 2020/0036937 A1* | 1/2020 | Zhou | H04N 21/44008 |
| 2020/0092571 A1* | 3/2020 | Tourapis | H04N 19/167 |
| 2020/0134907 A1* | 4/2020 | Epstein | G06T 7/536 |
| 2021/0132898 A1* | 5/2021 | Lee | G06F 3/011 |

OTHER PUBLICATIONS

"List of Common Coordinate Transformation," downloaded from Wikipedia—https://en.wikipedia.org/wiki/List_of_common_coordinate_transformations; Nov. 11, 2019 (8 pages).
European Search Report issued in European Patent Application EP 18215479.9; Date of completion May 21, 2019 (3 pages).

* cited by examiner

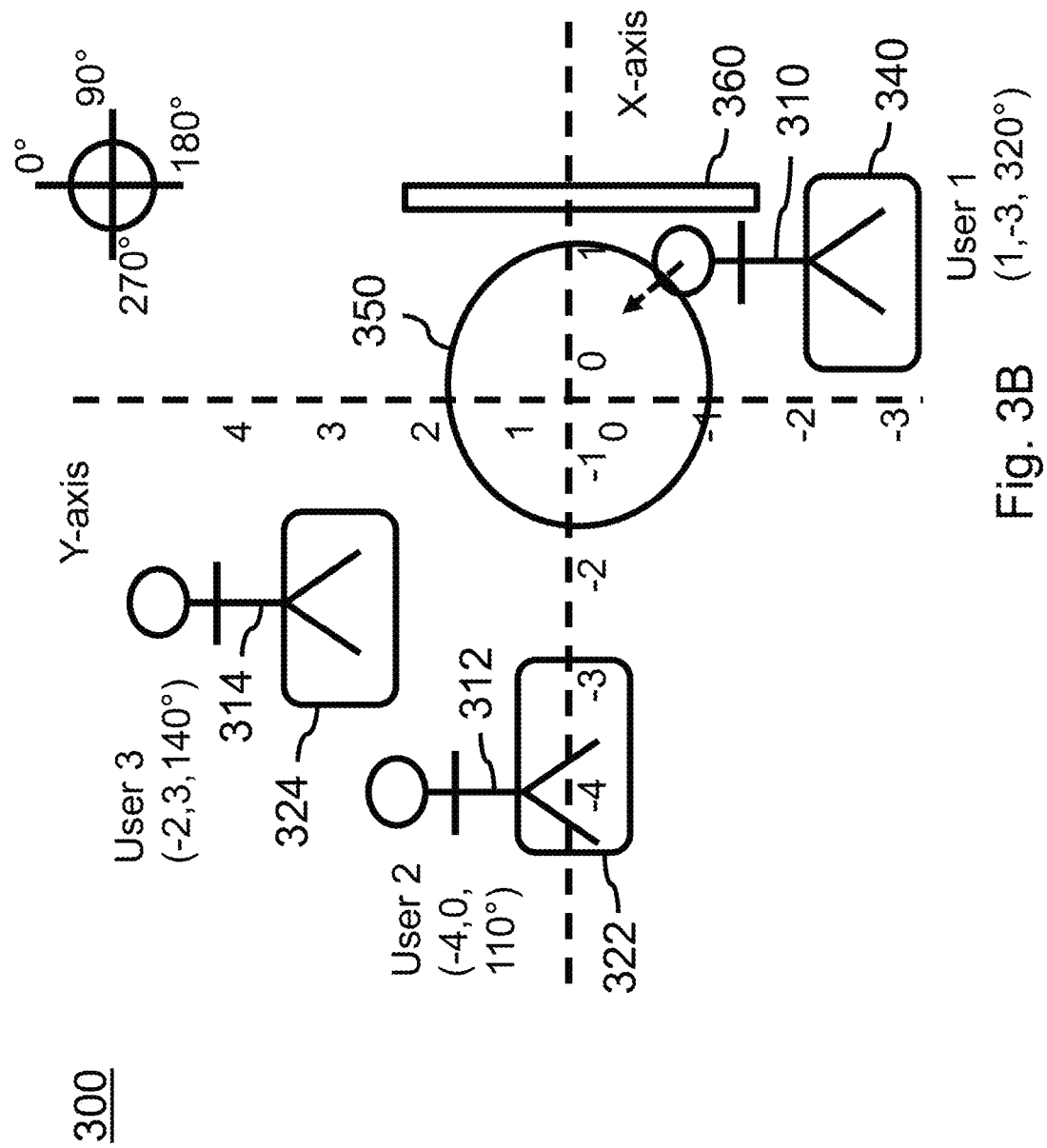

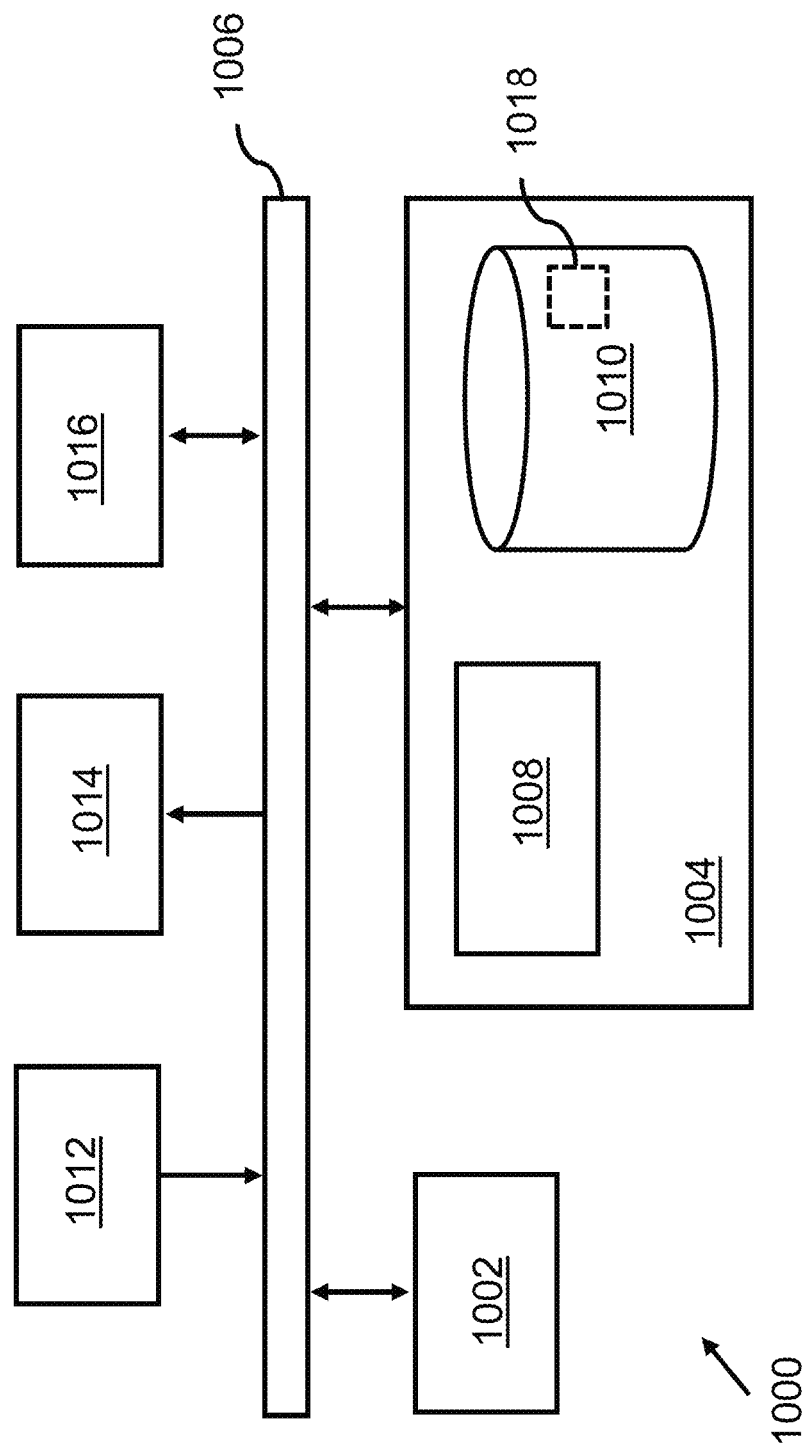

GENERATING AND SIGNALING TRANSITION BETWEEN PANORAMIC IMAGES

RELATED APPLICATION

This application claims priority under 35 U.S.C. § 119 or 365 to European Application No. 18215479.9, filed Dec. 21, 2018. The entire teachings of the above application are incorporated herein by reference.

TECHNICAL FIELD

The invention relates to a processor system and a computer-implemented method for rendering a multiuser virtual environment, for example in Virtual Reality or Augmented Reality. The invention further relates to a computer readable medium comprising transition data defining a transition, in a rendering of a multiuser virtual environment by a processor system, to a viewing position in the virtual environment. The invention further relates to a processor system and a computer-implemented method for rendering a multiuser virtual environment. The invention further relates to a computer program comprising instructions for carrying out either method.

BACKGROUND

It is known for users to share experiences and/or communicate with each other in a virtual environment, with the virtual environment being defined by data and rendered to the respective users by respective devices or systems, e.g., computers, smartphones, head-mounted devices, etc. The virtual environment is typically a three-dimensional (3D) virtual environment, which may be visually and typically also auditorily rendered to a user. For example, two or more users may be represented in a virtual room, and may interact with each other using visual and/or audio cues. An example of a visual representation of a user is a so-called avatar, which may be a graphical object having, e.g., a generic humanoid form or perhaps mimicking a specific character or the specific appearance of the user. Another example of a visual representation is a so-called 'video avatar' showing a real-time video of the user, e.g., as recorded by a camera. An example of an auditory representation of a user is a virtual loudspeaker which may output real-time audio of user, e.g., as recorded by a microphone. The representation of the user in the virtual environment, e.g., the (video) avatar and/or the virtual loudspeaker, may be coupled in terms of position and/or orientation to a virtual camera and/or virtual microphone, which may define the position and/or orientation from which the virtual environment is visually and/or auditorily rendered to the user. Such a position is henceforth also simply referred to as 'viewing position', whereas such an orientation is hence also simply referred to as 'viewing orientation'.

Virtual environments may generally give users the feeling that they are together in the same physical environment, especially when the virtual environment is immersive and also rendered to a user in an immersive manner. For example, the virtual environment may be rendered to a user in Virtual Reality (VR) or Augmented Reality (AR), e.g., using Head Mounted Displays (HMD) and headtracking. This, however, is not a requirement, as a virtual environment may also be rendered in a conventional manner, e.g., using a non-HMD type of display and by using an input modality other than headtracking, for example using a touch screen, mouse, etc.

A virtual environment may be constructed in several ways, for example as a 3D model which simulates real-world dimensions and allows for movement through the virtual environment. However, creating 3D models is time and resource intensive, even more so if the goal is to create a realistic-looking 3D model. Also, rendering complex 3D models may be demanding, which may result in performance issues.

Another way to establish at least part of a virtual environment is to use a panoramic or omnidirectional image or video to show a scene in the virtual environment. Such images or videos may either be 2D (monoscopic) or 3D (stereoscopic or volumetric), and may be displayed on a virtual body in the virtual environment, such as the inside of a sphere. The virtual environment may then be rendered from a viewpoint within or facing the virtual body, thereby providing a user with a panoramic or omnidirectional view of the scene captured by the image or video.

For ease of explanation, the following further refers only to 'images' instead of 'images or videos', with the understanding that a video is represented by a time-series of images and thereby a reference to 'image' may be considered to include an image of a video, e.g., a video frame, unless otherwise noted. In addition, the term 'omnidirectional' is to be understood as providing a 360° view of a scene, whereas 'panoramic' is to be understood as providing a wider field of view than that of the human eye (being about 160° horizontally by 75° vertically). For example, a panoramic image may provide a 180° by 180° view of a scene. An omnidirectional image is thereby a type of panoramic image. The following only refers to panoramic images.

As panoramic images are typically captured from a specific point in the physical world, or prerendered from a specific point in a virtual world, these images may only provide one perspective of the scene to a viewer; typically, no movement through the scene is possible. However, such images may be simply photos of a scene, which may provide a photorealistic reproduction of the scene and thereby contribute to immersion, while it may take relatively little effort to create such photos. In addition, the rendering of such images in the virtual environment, e.g., using a virtual body, may be (far) less demanding than the rendering of a comparatively realistic 3D model. The latter advantage also applies if the image is a prerendered image of such a realistic 3D model, e.g. as its rendering may be performed offline rather than real-time.

An exemplary use case of such photorealistic environments may be teleconferencing, in which users may have a fixed position in a virtual environment and in which different panoramic images of a meeting room may be shown to each of the users depending on their position. Each of the different panoramic images may be captured from a specific point in the physical world, e.g., in the physical meeting room, which may match the particular fixed position of the user. Thereby, the impression may be conveyed to the users that they are actually in the meeting room.

It may nevertheless be desirable to enable limited movement within a virtual environment which uses panoramic images to provide different perspectives within a scene, e.g., a same room or adjacent rooms or places. In general, the term 'scene' may refer to a physically connected space, with the understanding that the physically connected space may contain partitionings, such as doors, windows, walls, etc.

For example, a user may be enabled to select his/her position in the virtual environment, e.g., by selecting an empty chair in the meeting room. As a result of the selection, a different panoramic image may be displayed to the user, namely one which shows the meeting room from the perspective of the newly selected position. From a technical perspective, this may correspond to the virtual environment having a number of viewing positions for which panoramic images are available to be rendered. When the user selects another viewing position in the virtual environment, the currently displayed panoramic image may be switched to the 'new' panoramic image.

It is known to provide the user with a sense of transition when switching between panoramic images of a particular scene. Such a transition may seek to simulate the movement which may be involved when transitioning within the physical world from the capture point of the initially displayed ('first') panoramic image to the capture point of the subsequently displayed ('second') panoramic image.

For example, US20060132482A1 describes a method and system for creating a transition between a first scene and a second scene on a computer system display, simulating motion. The method includes determining a transformation that maps the first scene into the second scene. Motion between the scenes is simulated by displaying transitional images that include a transitional scene based on a transitional object in the first scene and in the second scene. The rendering of the transitional object evolves according to specified transitional parameters as the transitional images are displayed. A viewer receives a sense of the connectedness of the scenes from the transitional images. Virtual tours of broad areas, such as cityscapes, can be created using inter-scene transitions among a complex network of pairs of scenes.

It is noted that US20060132482A1 may use a narrower interpretation of the term 'scene' than the present specification, in that for example a cityscape may be considered a physically connected space and thereby a scene.

A disadvantage of the technique of US20060132482A1 is that it is insufficiently suitable to be used in a multiuser virtual environment.

SUMMARY

It would be advantageous to obtain a system or method which provides a user with a sense of transition when switching between panoramic images of a same or connected scenes, which is better suitable for a multiuser virtual environment.

In accordance with a first aspect of the invention, a processor system may be provided for rendering a multiuser virtual environment.

The processor system may comprise:
a communication interface;
an input interface for accessing:
    at least two panoramic images, each of the panoramic images representing a different image-based background for the virtual environment;
    metadata defining viewing positions in the virtual environment for which viewing positions respective panoramic images are to be rendered when a respective viewing position in the virtual environment is selected;
a processor configured to:
    for a first viewing position, render a first panoramic image;
    in response to a selection of a second viewing position, render a transition in the virtual environment to the second viewing position using the metadata, and at completion of said rendering of the transition, render the second panoramic image for the second viewing position;
    using the metadata, generate transition data indicative of the transition to the second viewing position;
    via the communication interface, output the transition data to enable another processor system which renders at least part of the multiuser virtual environment to establish, in the other processor system's rendering of the virtual environment, a representation of the transition to the second viewing position.

In accordance with a further aspect of the invention, a computer-implemented method may be provided for rendering a multiuser virtual environment.

The method may comprise:
accessing:
    at least two panoramic images, each of the panoramic images representing a different image-based background for the virtual environment;
    metadata defining viewing positions in the virtual environment for which viewing positions respective panoramic images are to be rendered when a respective viewing position in the virtual environment is selected;
for a first viewing position, rendering a first panoramic image;
in response to a selection of a second viewing position, rendering a transition in the virtual environment to the second viewing position using the metadata, and at completion of said rendering of the transition, rendering the second panoramic image for the second viewing position;
using the metadata, generating transition data indicative of the transition to the second viewing position; and
outputting the transition data to enable a remote entity which renders at least part of the multiuser virtual environment to establish, in the remote entity's rendering of the virtual environment, a representation of the transition to the second viewing position.

In accordance with a further aspect of the invention, a processor system may be provided for rendering a multiuser virtual environment.

The processor system may comprise:
a communication interface;
a processor configured to:
    when rendering at least part of the virtual environment, rendering a representation of a first viewing position in the virtual environment from which the virtual environment is rendered by another processor system;
    via the communication interface, receive transition data which is indicative of a transition by the other processor system to a second viewing position in the virtual environment from which the virtual environment is rendered; and
    using the transition data, establish a representation of the transition to the second viewing position in the virtual environment.

In accordance with a further aspect of the invention, a computer-implemented method may be provided for rendering a multiuser virtual environment.

The method may comprise:
rendering at least part of the virtual environment, said rendering comprising rendering a representation of a first viewing position in the virtual environment from which the virtual environment is rendered by a remote entity;

receiving transition data which is indicative of a transition by the remote entity to a second viewing position in the virtual environment from which the virtual environment is rendered; and using the transition data, establishing a representation of the transition to the second viewing position in the virtual environment.

The above measures may provide two types of processor systems: a first processor system which may be configured to generate and output transition data, and a second processor system which may be configured to receive and use the transition data. Both processor systems may represent client devices for a multiuser communication session which takes place in a virtual environment, e.g., of the type introduced in the background section. In some embodiments, a single processor system may have all limitations described for each processor system individually. In other words, a single processor system, such as a single client device, may be configured to generate and output the transition data to another client device, and to receive and use transition data from the other client device. The above also applies to a computer program comprising instructions for causing a processor system to perform either method: in some embodiments, the computer program may comprise instructions for causing or enabling a single processor system to perform each of the methods.

In accordance with the above measures, the first processor system may be configured to establish a virtual environment which uses panoramic images to provide a user with panoramic views of a scene at discrete viewing positions within the virtual environment. For that purpose, several panoramic images may be provided, which may represent different capture points within the scene. Such type of virtual environment typically does not support free movement. However, the first processor system may enable movement in the virtual environment by enabling switching between viewing positions, and thereby panoramic images. For example, the virtual environment may be rendered to a user (henceforth also referred to as 'first' user) from a first viewing position, where a first panoramic image may be shown to the first user. In response to a selection of a second viewing position, e.g., by the first user or by way of an automatic selection by the first processor system or another entity, e.g., following an event, the virtual environment may be rendered to the first user from a second viewing position, where a second panoramic image may be shown to the first user.

However, the switching may be experienced by the first user as a 'jump', e.g., a sudden change between panoramic images without transition. Namely, the transition to another panoramic image may represent a sudden transition to another viewing position in the scene. Additionally or alternatively, the viewing orientation of the user may change with respect to the scene, as both panoramic images may be captured from using different capture orientations within the scene. For example, in a scene containing a table and in which the panoramic images portray the scene from different seating positions at the table, the transition to another panoramic image which represents a viewing position across the table may change the user's viewing orientation with respect to the scene by approximately 180-degrees. This may provide an unnatural experience, which may reduce the first user's sense of immersion. As such, before displaying the second panoramic image, the first processor system may render a transition from the first panoramic image to the second panoramic image, for example in the form of an animation which conveys the user a sense of movement from the capture point of the first panoramic image to the capture point of the second panoramic image. Such a transition between panoramic images is known per se.

However, in the case of a multiuser virtual environment, the transition may normally only be rendered to the first user, while the other users in the virtual environment may be unaware of the transition experienced by the first user. For example, a second user which uses a second processor system as a client device for the multiuser virtual environment may not be shown the transition between panoramic images, for example since he/she maintains his/her viewing position in the multiuser virtual environment. The transition presented to the first user may thus not be conveyed to the second user. Conceivably, if a signaling of a change in viewing position is implemented in the multiuser virtual environment, the second user would see a representation of the first user in the virtual environment, such as an avatar, simply 'jumping' to the second viewing position after completion of the transition. This may provide an unnatural experience to the second user, which may reduce the second user's sense of immersion and/or may cause confusion of the second user.

The above measures may establish a representation of the transition of the first user in the virtual environment, for example by causing a representation of the first user in the virtual environment, such as an avatar, to move along a trajectory in the virtual environment while the transition between panoramic images is presented to the first user. Although such a movement trajectory does not directly follow from either the discrete viewing positions nor from the transition itself, an analogous movement trajectory may be established, or in general a representation of the transition which may convey to the second user that the first user is experiencing the transition.

For that purpose, transition data may be generated which may be indicative of the transition provided to the user, for example by defining a trajectory in the virtual environment which mimics the physical movement experienced by the first user during the transition in the virtual environment. Namely, the transition presented to the first user may simulate or otherwise convey a sense of physical movement which may take place between the different capture positions in the physical world of the respective panoramic images. These different capture positions may be represented in the virtual environment by the different viewing positions at which the respective panoramic images may be displayed, as these viewing positions may have been preselected, e.g., during design of the virtual environment or during design or execution of an application which uses the virtual environment, to at least coarsely match the different capture positions. A reason for this may be consistency. For example, other elements in the virtual environment, such as graphical objects, avatars of other users, virtual loudspeakers and the like, should preferably also appear to move during the transition, or at least reposition after completion of the rendering of the transition, relative to the first user in a way which matches the experienced physical movement. Likewise, a representation of the first user in the multiuser virtual environment, such as an avatar, should after completion of the transition be shown at a position which is consistent with the new panoramic image. For example, if the first user selects a viewing position in the virtual environment at which he/she expects to be closer to a whiteboard in the meeting room, he/she should be presented with a panoramic image which shows the meeting room from a perspective closer to the whiteboard, but also the second user should perceive the representation (e.g. avatar) of the first user to be closer to the whiteboard.

The transition data may thus be generated to be indicative of the transition to the second viewpoint position based at least in part on metadata which defines the second viewpoint position, and typically also the first viewing position, in the virtual environment. The transition data may then be output via a communication interface, such as a network interface, to enable another processor system which renders at least part of the multi-user virtual environment, e.g., the aforementioned second processor system, to establish, in the other processor system's rendering of the virtual environment, a representation of the transition to the second viewing position. For example, the avatar of the first user may be shown to move along a trajectory in the virtual environment in the virtual environment while the transition between panoramic images is presented to the first user. This visual representation of the transition may comprise moving the avatar of the first user from the first viewing position to the second viewing position, and may also include rotating the avatar to reflect a change in viewing orientation between the first and second viewing position. By doing so, the second user may be provided with a sense of transition of the first user without actually being provided with the transition itself, e.g., the transition from first panoramic image to second panoramic image. Thereby, a more natural experience may be provided to the second user, e.g., compared to the representation of the first user suddenly 'jumping' in the virtual environment to the second viewing position, which may maintain or improve the second user's sense of immersion and/or may avoid confusion of the second user.

In the above and following, the term 'viewing position' may imply a 'discrete' viewing position, e.g., a single point in the virtual environment, but in some cases also correspond to a limited viewing area. For example, at a viewing position, limited head movement of the user may still be allowed, while walking or similar type of movement may not be supported, as is mostly the case in current volumetric video solutions. A 'discrete' viewing position may thus correspond to a principal viewing position from which limited head movement of the user is still allowed. Effectively, rather than supporting free movement across a large area in the virtual environment, discrete points or smaller non-connected areas may be defined in the virtual environment to represent possible viewing positions in the virtual environment.

The term 'representation of a user' may include a visual representation, such as an avatar, and/or an auditory representation, such as a virtual loudspeaker.

The term 'representation of the transition' may, as also elucidated with reference to the various embodiments, involve representing the transition using the representation of the first user, e.g., for example by moving an avatar of the first user, but may also involve a separate representation, e.g., a static or animated arrow.

In an embodiment, the processor of the first processor system may be configured to generate the transition data to comprise at least one of:
  destination data defining at least the second viewing position;
  trajectory data defining at least part of a non-linear trajectory from the first viewing position to the second viewing position;
  duration data defining a time duration of the transition; and
  orientation data defining an orientation of a virtual camera which is used in the rendering of the virtual environment during or at an end of the transition.

The above types of data may enable the second processor system to better establish the representation of the transition to the second viewing position to match the transition experienced by the first user. For example, the destination data may allow the second processor system to establish a trajectory from the first viewing position, which itself may be already known to the second processor system, to the second viewing position, e.g., by determining a linear trajectory between both viewing positions. The trajectory data may rather allow the first processor system to determine at least part of the trajectory, and may in particular allow the first processor system to define a non-linear trajectory which may take into account information on the scene shown in the panoramic image(s) and/or information on other graphical objects in the virtual environment. For example, if the first viewing position and the second viewing position are viewing positions along a round table, being either part of the scene imaged by the panoramic images or a separate graphical object, the trajectory may be defined as a curved trajectory which appears to follow the periphery of the table, rather than a straight trajectory which would appear to cut through part of the table. It will be appreciated that such a non-linear trajectory may also be determined by the second processor system based on the destination data and similar types of information.

The duration data may allow the second processor system to match the duration at which the representation of the transition of the first user is provided in the virtual environment, or for which the representation of the transition is generated, to the length of the transition experienced by the first user. For example, if the avatar of the first user is moved by the second processor system along a movement trajectory so as to establish a representation of the transition provided to the first user, the speed of movement may be determined so that the movement trajectory is completed in the time duration, e.g., to match the speed of transition as experienced by the first user. Another example is that if the representation of the trajectory is a static or animated arrow pointing from the first viewing position to the second viewing position in the virtual environment, the arrow may be provided for the length of the time duration.

The orientation data may allow the second processor system to not only mimic, by way of a representation of the transition, a change in viewing position, but also a change in viewing orientation. Such a viewing orientation may for example define the first user's field of view in the virtual environment, and may be determined based on user input, e.g., using headtracking by an HMD, but may in some cases also be determined by the system. For example, in the aforementioned example of a scene shown by the panoramic images showing a table, the viewing orientation may be reset to a direction which faces the table's center when selecting a viewing position at the opposite side of the table, so as to avoid the first user from having to manually change his/her viewing orientation, e.g., by turning his/her head and/or entire body when using headtracking or by using another type of user input device. The viewing orientation may be represented in the representation of the first user in the virtual environment, for example by redirecting a head of an avatar or a directional virtual loudspeaker in the virtual environment. Accordingly, such a change in viewing orientation during or after the transition may be represented in the virtual environment using the orientation data.

In an embodiment, the processor of the first processor system may be configured to generate the transition data to comprise timing data defining when the transition is rendered, or is scheduled to be rendered, by the processor system. This may for example allow the first processor system to schedule the transition, and thereby allow the first processor system to provide the transition data to the second processor system well in advance of the actual transition taking place. This may allow the transition, and its representation in the virtual environment, to be performed substantially synchronously without otherwise needing a synchronization mechanism (except for substantially synchronized clocks or a similar common basis for the timing data). Without such timing data or another synchronization mechanism, the receipt of the transition data may be considered as instruction for the second processor system to establish the representation of the transition, which may in turn require the first processor system to send the transition data at a specific moment in time. This may be complicated and prone to communication delays, e.g., due to network latency.

In an embodiment, the processor of the first processor system may be configured to generate the transition data before rendering the transition. The transition data may thus be provided as a self-contained announcement of the transition, in that the transition data may contain all necessary data for the second processor system to subsequently establish the representation of the transition in the virtual environment.

In an embodiment, the processor of the first processor system may be configured to render the transition using a mathematical transformation of the first panoramic image to the second panoramic image. The mathematical transformation may thus be applied to the image data of both panoramic images to create a transition which simulates or otherwise conveys a sense of physical movement which may take place between the different capture positions in the physical world of the respective panoramic images. In some embodiments, the mathematical transformation may be used to create a transitional animation from the first panoramic image to the second panoramic image. For example, the mathematical transformation may be a spherical image transformation, for example a Mobius transformation-based spherical image transformation. An advantage of such types of mathematical transformations may be that they may generate a transitional animation which conveys the user with a sense of moving rather than 'jumping' through the scene while using only two or a similarly limited number of panoramic images as input. Such transitional animations may otherwise and conventionally require the capture and display of a series of panoramic images at intermediate position between both viewing positions in the scene, which may be complex to perform and/or may require significant data storage.

In an embodiment, the processor of the first processor system may be configured to generate the transition data as real-time or near real-time data which is indicative of a current progress in the transition to the second viewing position. Instead of providing the transition data as self-contained data to the second processor system, the first processor system may instead send the transition data as a series of transition data parts over time, with the time of sending, the time of receipt or a timestamp in the data part being indicative of a current progress in the transition to the second viewing position. This may avoid the need for the first processor system to provide other types of timing information. In some embodiments, the first processor system may itself determine a trajectory from the first viewing position to the second viewing position before presenting the transition to the user, and signal a progress along the trajectory by sending a series of coordinates representing intermediate viewing positions along the trajectory to the second processor system while the transition from the first panoramic image to the second panoramic image is presented to the first user. Such intermediate viewing positions may be determined by the first processor system by time-based interpolation or tracing along the predetermined motion trajectory, or in other embodiments, by the second processor system, or these may be predefined.

In an embodiment, the transition data may comprise duration data defining a time duration of the transition, and the processor of the second processor system may be configured to establish the representation of the transition as an animation or movement trajectory spanning the time duration. For example, the first processor system may announce via the transition data that the transition presented to the first user will take 800 ms, which may enable the second processor system to generate an animation or movement trajectory which will be completed in approximately 800 ms. Additionally or alternatively to a duration, the transition data may comprise an indication of a speed with which the transition is to be rendered by the second processor system. The speed may be defined in various ways, e.g., using a quantity which is associated with a coordinate system of the virtual environment, or in any other way.

In an embodiment, the processor of the second processor system may be configured to establish the representation of the first viewing position as a visual representation of a remote user, such as an avatar, and to establish the transition as a movement trajectory of the visual representation of the remote user.

In an embodiment, the processor of the first processor system may be configured to gradually move a current viewing position of the user in the virtual environment to the second viewing position during the rendering of the transition, and/or to gradually adjust a current viewing orientation of the user from a first viewing orientation at the first viewing position to a second viewing orientation at the second viewing orientation. Here, the terms 'current viewing position' and 'current viewing orientations' may refer to a position and orientation of a virtual camera in the virtual environment which is used to render the virtual environment. By said moving and/or adjusting, other elements in the virtual environment, such as graphical objects, avatars of other users, virtual loudspeakers and the like, may gradually adjust their position during the transition in a way which matches the experienced physical movement.

In some embodiments, the panoramic images of the scene may be generated on-demand, e.g., by different cameras or a moveable camera in a physical scene. In general, 'accessing at least two panoramic images' maybe understood as including the time-sequential access of such panoramic images, in that the second panoramic image may only be generated and/or accessible when the second viewing position is selected. In some embodiments, the transition which is rendered between the panoramic images may be provided or represented by a video feed of a movable camera which moves between a first capture position and a second capture position. In some embodiments, the panoramic images may be rendered on-demand, e.g., by a server or other entity, and then accessed by the first processor system.

In a further aspect of the invention, a transitory or non-transitory computer-readable medium may be provided comprising transition data. The transition data may define a transition, in a rendering of a multi-user virtual environment by a processor system, to a viewing position in the virtual environment.

In an embodiment, the transition data may comprise at least one of:
- destination data defining at least the viewing position;
- trajectory data defining at least part of a non-linear trajectory from the first viewing position to the second viewing position;
- duration data defining a time duration of the transition; and
- orientation data defining an orientation of a virtual camera which is used in the rendering of the virtual environment during or at an end of the transition.

It will be appreciated by those skilled in the art that two or more of the above-mentioned embodiments, implementations, and/or aspects of the invention may be combined in any way deemed useful.

Modifications and variations of the method(s), the processor system(s), the transition data and/or the computer program(s), which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 3B shows the user at the second viewing position;

FIG. 14 shows an exemplary data processing system.

Figure 1:
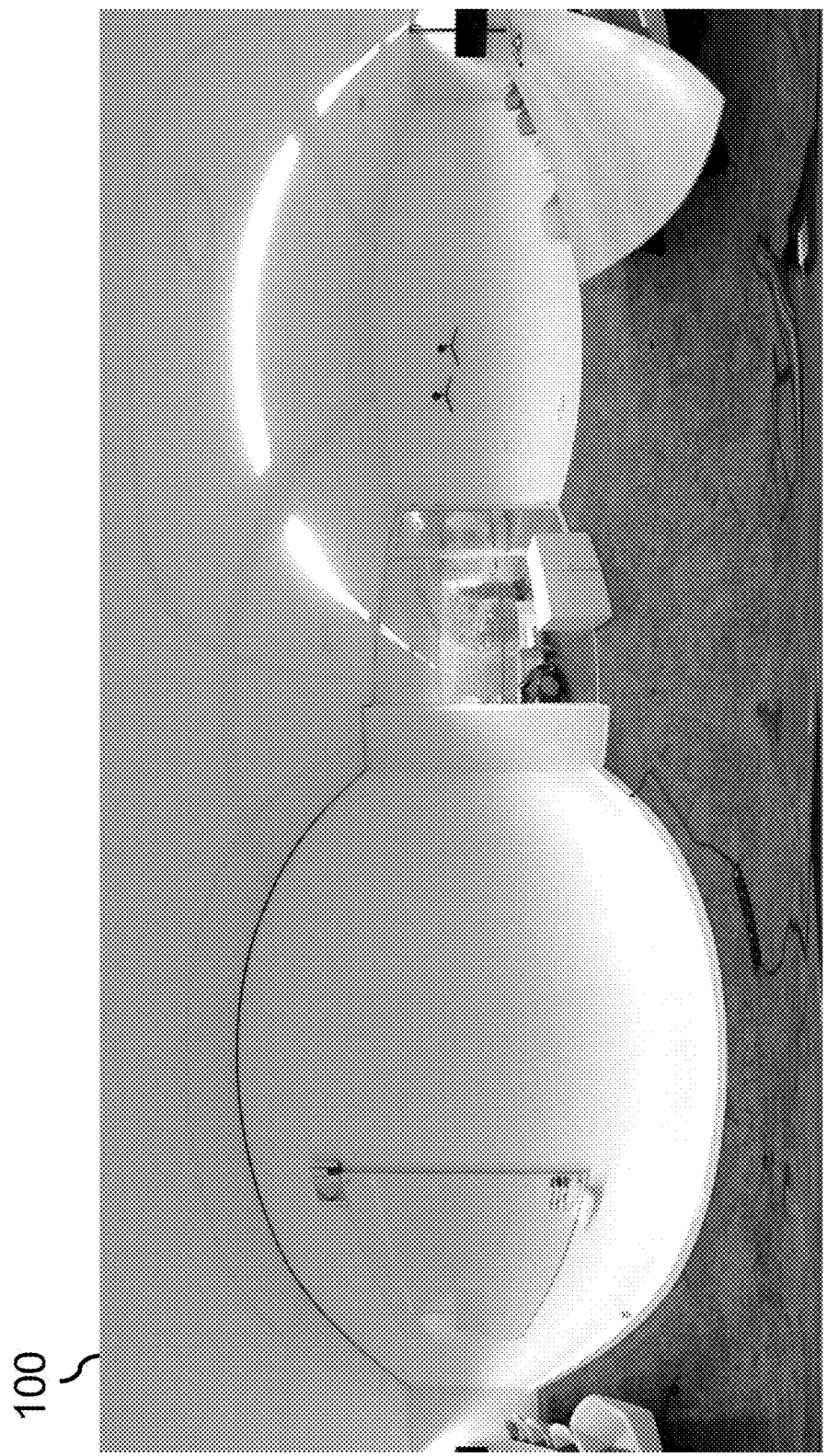
FIG. 1 shows a panoramic image, which is in this example mapped to a rectangular image format using an equirectangular projection or mapping.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 panoramic image
200 virtual environment
202 panoramic image displayed on inside of sphere
210, 212 representation of user
220 viewing position
230 virtual camera
240 field of view of virtual camera
300 virtual environment
310-314 representation of user (avatar)
310 representation of transitioning user
320-324 viewing position
320 first viewing position
330 switching to second viewing position
340 second viewing position
350 object (table)
360 object (display)
370 movement of user as visual representation of transition
380, 382 animated object (arrow) as visual representation of transition
400 first panoramic image
410 snapshot of transition to second panoramic image
412 boundary in transition
420 second panoramic image
500 transitioning user
502 observing user
510 receive trigger
520 construct message
530 send message
540 execute transition
550 receive message
560 execute transition
600, 602 processor system
610, 612 controller
620, 622 capture
630, 632 render
640, 642 transport
650, 652 transition data 660, 662 RGB(D) camera
670, 672 input device(s)
680, 682 VR HMD
685, 687 display data
690 network
700 processor system
710 communication interface
720 input interface
725 data storage
730 processor
740 display output
742 display data
745 display
800 method for rendering transition
810 accessing panoramic images, metadata
820 rendering first panoramic image
830 generating transition data
840 outputting transition data
850 rendering transition to second panoramic image
860 method for rendering representation of transition
870 rendering representation of first viewing position
880 receiving transition data
890 rendering representation of transition to second viewing position
900 computer readable medium
910 non-transitory data
1000 exemplary data processing system
1002 processor
1004 memory element
1006 system bus
1008 local memory
1010 bulk storage device
1012 input device
1014 output device
1016 network adapter
1018 application The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

The following embodiments relate to rendering a multiuser virtual environment for which a number of panoramic images of a scene are available and in which the panoramic images may be used as image-based background for different viewing positions in the virtual environment. Here, the term 'available' may typically refer to panoramic images having previously been generated and their image data being accessible. However, in some embodiments, such panoramic images may be generated on-demand, e.g., by different cameras in a scene or by a movable camera. As also indicated in the background section, the term 'image' is to be understood as equally applying to a video frame, and the term 'panoramic' includes 'omnidirectional'.

A specific example of a multiuser virtual environment is a 'Social VR'-based virtual environment, in which a number of users may participate in a teleconference using Head Mounted Displays (HMDs) and cameras and in which the users may be represented by so-called video avatars showing their camera's video capture.

However, the techniques described in this specification may also be applied to all other multiuser virtual environments in which panoramic images are used as image-based background for different viewing positions in the virtual environment. A non-limiting example is a multiuser virtual environment which is experienced using non-head mounted displays, e.g., using the built-in displays of a smartphone or tablet or using a television or computer monitor, and in which users are represented by non-video-based avatars, e.g., as graphical objects, or perhaps having only an auditory representation within the virtual environment, e.g., in the form of a virtual loudspeaker.

FIG. 1 shows a panoramic image 100 acquired from within a meeting room, with the resulting image 100 providing a 360-degree view from within the meeting room. The room imaged by the panoramic image 100 is shown to comprise walls, a door, a table with chairs, a display for presentations, etc. Typically, the field of view shown by a panoramic image is spherical but may be represented within the rectangular canvas of an image by means of a projection. The panoramic image 100 is shown to be projected using an equirectangular projection. Other projections may be used as well, such as skybox projections (also referred to as cube maps).

Panoramic images are frequently viewed in Virtual Reality. Virtual Reality (VR) generally involves the use of computer technology to simulate a user's physical presence in a virtual reality environment (which is henceforth also simply referred to as 'virtual environment'). Typically, VR rendering devices make use of Head Mounted Displays (HMDs) to render the virtual environment to the user, although other types of VR displays and rendering techniques may be used as well, including but not limited to holography and Cave Automatic Virtual Environments (recursive acronym CAVE).

Generally, rendering a panoramic image may involve displaying image data of the panoramic image on a surface of a virtual body, such as on the inside of a sphere, semi-sphere, cube, box or any other geometrical primitive, and rendering the panoramic image from a viewpoint within or facing the virtual body. Here, the virtual body may be a geometric construct, which may for example be defined by a set of coordinates or by one or more parameters (such as the radius defining the size of a sphere) or by a mesh representing the virtual body and which may be 'virtual' by the body not being explicitly rendered but rather used as display surface for the image data. Accordingly, the virtual body itself is normally not visible, with the possible exception of rendering artifacts. To display the image(s) on the virtual body, a projection may be used. Such a projection may involve a coordinate mapping from the typically rectangular coordinates of the image(s) to a coordinate system associated with the virtual body. For example, if the virtual body is a sphere and associated with a spherical coordinate system, the coordinate mapping may map coordinates from the rectangular coordinate system of the image(s) to the spherical coordinate system, or vice versa. The above-described display of panoramic images in VR is known per se, for example, from so-called 'Photo Sphere Viewer' applications in VR.

Figure 2:
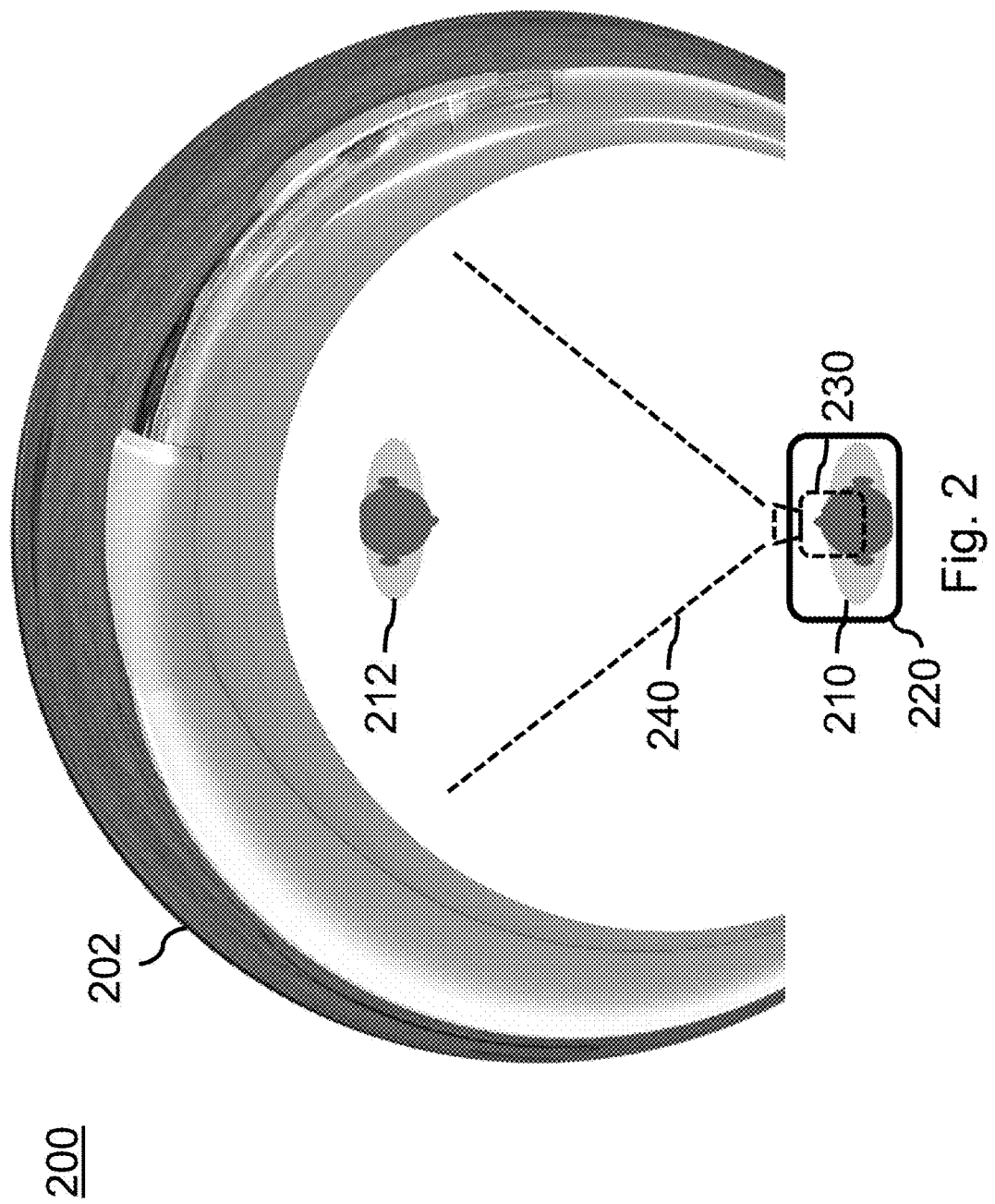
FIG. 2 shows a schematic and top-down view of a virtual environment in which the panoramic image is displayed on the inside of a sphere, in which users are represented by avatars in the virtual environment, and in which the virtual environment containing the avatars is rendered to respective users using a virtual camera.

FIGS. 2-3B show examples of another application in which panoramic images such as the one of FIG. 1 are used as a 'backdrop' of a multiuser communication session in a multiuser virtual environment 200. FIG. 2 schematically shows the panoramic image of FIG. 1 being displayed on the inside of a sphere 202. Participants in the multiuser communication session, which are henceforth also simply referred to as 'users', may be represented by avatars 210, 212 within the virtual environment, while communicating via voice, e.g., using a microphone and speakers, and possibly by nonverbal communication. Here, the term 'avatar' refers to a visual representation of the user within the virtual environment 200, which may include representations as real or imaginary persons, real or abstract objects, etc. Such representations may be image-based, e.g., by an avatar showing or consisting of an image or video of a user, or computer graphics-based or a combination of both. In some cases, a user may not be represented visually in the virtual environment, but only auditorily, e.g., as a virtual loudspeaker reproducing his/her captured voice.

FIG. 2 shows two of such avatars 210, 212 which are placed within the virtual environment 200, and specifically within the sphere 202 onto which the panoramic image is projected. Thereby, the imaged meeting room may provide an image-based backdrop for the communication session. The virtual environment 200 may then be rendered and displayed to one or more of the users. Such visual rendering may take place from the perspective of a user's avatar. This is shown schematically in FIG. 2 by a virtual camera 230 representing the viewing position and viewing orientation of one of the users being overlaid over its avatar 210. The field of view of the camera 240 may correspond to the field of view shown to the user, e.g., using an HMD. The orientation of the virtual camera 230 may be controlled by the user, for example based on so-called 3-Degree of Freedom (DoF) tracking of the user's head or HMD, thereby allowing the user to freely look around in the virtual environment 200.

The virtual environment 200 may provide a number of viewing positions for which different panoramic images may be available to be rendered. For that purpose, a number of panoramic images may be acquired at different capture positions within a scene. For example, a panoramic image may be acquired from the perspective of each of the chairs in the meeting room, while additionally acquiring a panoramic image from the perspective of a presenter before the display. When the user selects another viewing position in the virtual environment 200, e.g., to virtually switch chairs or to move from a seated position to a presenter position, or when such other viewing position is selected for the user, the currently displayed panoramic image may then be switched to the appropriate panoramic image. FIG. 2 shows the panoramic image of FIG. 1 being displayed for the user of the avatar 210 which is positioned at a particular viewing position 220 within the virtual environment 200. The viewing position may be a single point in the virtual environment 200, but may also be as a limited viewing area 220, e.g., reflecting that the virtual environment 200 may allow limited head movement of the user, while walking or similar type of movement may not be supported.

Figure 3A:
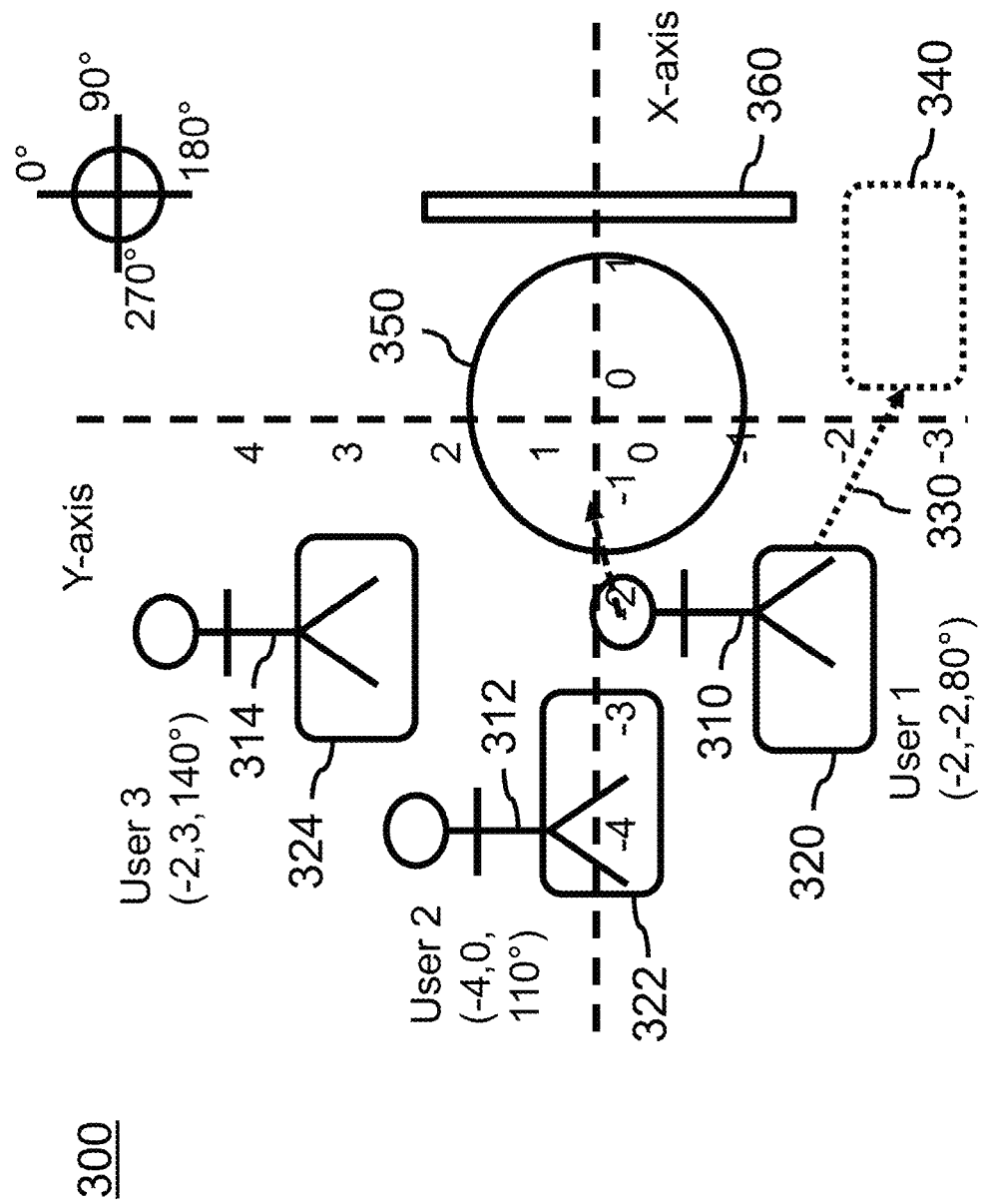
FIG. 3A illustrates a virtual environment having a number of viewing positions for which different panoramic images are available, and in which a user switches from a first viewing position for which a first panoramic image is displayed to a second viewing position for which a second panoramic image is displayed, with the user being shown a transition to the second panoramic image.

FIGS. 3A-3B illustrate a virtual environment 300 having a number of viewing positions for which different panoramic images may be available. The virtual environment 300 is shown in a different manner than the virtual environment 200 of FIG. 2, but may in some aspects be similar, in that a top-down view of the virtual environment is shown which includes avatars 310-314 of users 1-3. FIGS. 3A-3B further shows a X-Y position within the virtual environment 300 along a X- and Y-axis and a number of viewing positions 320-324. For each of the viewing positions 320-324, a different panoramic image of a scene, such as the aforementioned meeting room, may be available for display. FIG. 3A shows each of the users 1-3 at a different viewing position 320-324 with their respective avatars 310-314. Accordingly, as also explained with reference to FIG. 2 and elsewhere, each user 1-3 may be provided with a different panoramic image of a scene which reflects their different viewing position in the virtual environment 300. Unlike FIG. 2, FIGS. 3A-3B do not show the panoramic images themselves nor the virtual bodies on which they are displayed. The virtual environment 300 may further comprise objects such as a table 350 and a display 360. The table 350 and display 360 may represent 3D graphics objects in the virtual environment 300, but may also represent objects which are imaged by the panoramic image itself yet which may be perceived by users to be placed within the virtual environment 300.

FIG. 3A further illustrates a switching 330 of user 1 from a first viewing position 320 to a second viewing position 340 in the virtual environment 300, while FIG. 3B shows a result of the switching 330, namely that the user 1 is positioned at the second viewing position 340. It will be appreciated that such a switching of the user 1 may correspond to a repositioning of the user's representation (e.g., the avatar 310, virtual loudspeaker) and virtual entities defining the user's rendering of the virtual environment (e.g., virtual camera, virtual microphone) to the second viewing position, but which may in the following and elsewhere be simply referred to as a switching or 'transitioning' of the user itself. At the second viewing position 340, the user 1 may be shown a different panoramic image than at the first viewing position 320. For example, the first viewing position 320 may correspond to a seated position at the table 350 for which user 1 may be presented with a panoramic image from the perspective of a chair, while the second viewing position 340 may correspond to a presenter position at the display 360 for which user 1 may be presented with a panoramic image from the perspective of a standing presenter. In the following and elsewhere, the 'origin' viewing position and associated panoramic image may be simply referred to by the prefix 'first', and the 'destination' viewing position and associated panoramic image maybe simply referred to by the prefix 'second'. As explained elsewhere, such a transition may be initiated by the user, e.g., by way of a selection by the user, or in any other way, e.g., automatically by a processor system in response to an event, by another user, etc.

Figure 4A:
FIG. 4A shows a first panoramic image.
Figure 4B:
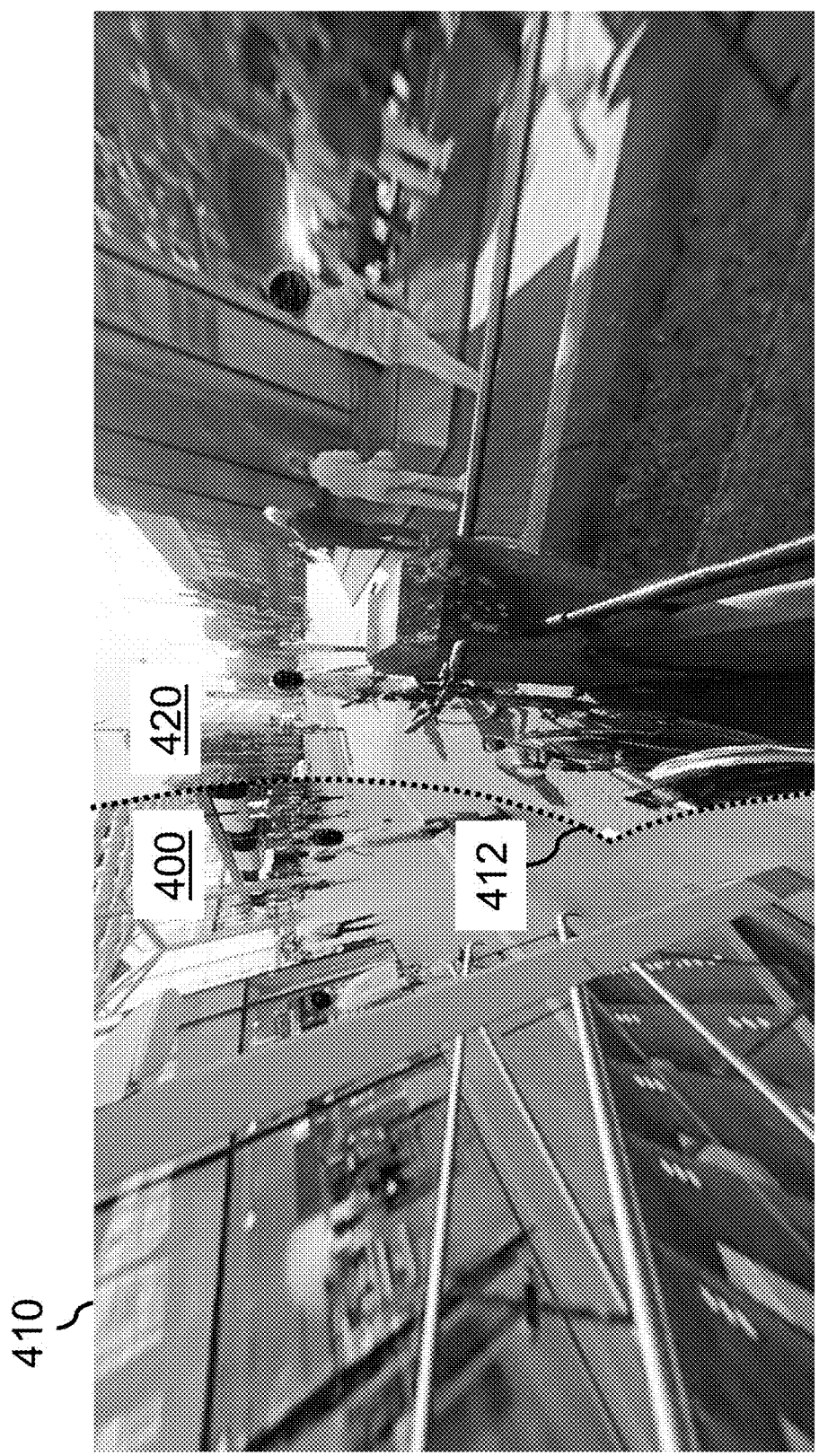
FIG. 4B shows a snapshot of a transition to a second panoramic image.
Figure 4C:
FIG. 4C shows the second panoramic image.

Although not shown in FIGS. 3A-3B itself, to avoid the user 1 being presented with a sudden change between panoramic images, and thereby to experience a sudden change in perceived position and possibly orientation within the scene, a transition may be rendered to the second viewing position. For example, such a transition may use a mathematical transformation of the first panoramic image to the second panoramic image, such as a Mobius transformation-based spherical image transformation. Such a transition is illustrated in FIGS. 4A-4C, in which FIG. 4A shows a first panoramic image 400, FIG. 4B shows a snapshot of the transition 410 to a second panoramic image in which a boundary 412 is visible between the panoramic images, and FIG. 4C shows the second panoramic image 420. During the transition 410, the boundary 412 may move to transition to the second panoramic image, e.g., as explained further onwards with reference to 'animating a transition'. It is noted that such a transition between panoramic images may not have an analogous concept in the virtual environment itself. Namely, although arrow 330 in FIG. 3A may suggest that the switching 330 is a form of 'movement' towards the second viewing position 340, the transition which is rendered to the user may not have such an analogous concept in the virtual environment. For example, if a Mobius transformation is applied to the image data of both panoramic images, a movement as suggested by arrow 330 does not directly follow from either the discrete viewing positions nor from the transition itself.

Instead of using a spherical image transformation which is based on a Mobius transformation, also other spherical image transformations may be used to transition between a source image, such as the first panoramic image, and a target image, such as the second panoramic image. An example of such a transformation is the zooming of spherical images. As described by [1] (see 'References' at the end of this specification), the zooming of spherical images may be performed using transformations in C→C of the form $z→z^p$, with $z∈C, p∈R, p>0, |z|=1$ where p resembles the zooming factor. From an equirectangular projection (ERP) image, a point on the sphere may be obtained using the inverse ERP projection. From this point on the sphere, angular coordinates $ϕ∈[−π,π], θ∈[−π/2,(π)/2]$ may be obtained using commonly known conversion techniques [1, 2]. This definition may center the zooming location on $ϕ=0$ and $θ=0$, while for different locations, the angular center may be translated modulo the angular sphere size (e.g. $2π$ for $ϕ$ and $π$ for $θ$). These angular coordinates may then be mapped onto the complex plane using $z\_1=e^ϕi$ and $z\_2=e^θi$. Next, a desired value for p can be used to construct the zooming function based on the aforementioned transformation equation. This function may then be applied on $z\_1, z\_2$ to obtain $z\_1^{'}, z\_2^{'}$. To map the new acquired values back to the source image, $z\_1^{'}, z\_2^{'}$ may be mapped back to spherical angles by determining their argument, thereby obtaining $ϕ^{'}, θ^{'}$. Using the ERP projection, a (new non-discrete) position on the original ERP image may be obtained. From this position, the image may be imaged to obtain a color value for the starting point. The above may be used to animate a transition from a source image towards a target image, which may be performed in two initial states:

1. Both images may already be visible, and the target image may only be partly visible and occupy a limited area in the source image.

2. There may be a 'hole' in the source image which may grow during the animation until the source image is no longer present. Directly behind the hole (as if it were the hole itself) the target image may be visible. The hole may effectively create the appearance to a user of a portal to the second viewing position in the scene.

In the first state, the source image and the target image may have some starting values of p, referred to as p_(s,i), p_(t,i) with the same constraints as above. An example assignment of values is the following: p_(s,i)=1, p_(t,i)=4, in which the target image may occupy 4 times the amount of image data than in its unzoomed state and hence may be displayed as if it were zoomed out. In order to display the target image without duplication it may need to occupy at most ¼ of the angular size of a full sphere on the sphere surface in any direction (e.g. $2π/4$ in angular distance from the center of the target image on the source sphere). The transition animation may be performed using an animation function a(t) which interpolates the p values over the animation duration d. One may define a(t) to correspond to the value for p_t at time t. In the example, one may have a(0)=4 and a(d)=1. During the animation, one may define p_s=p_t*p_(s,i)/p_(t,i) thereby keeping the zooming ratio equal. When the value for p_t changes, so may the size of its maximally visible angular distance from the center. During the animation this value may be equal to $2π/p\_t$. When rendering the source and target images, the source image should or may be rendered first, with the target image overlaying the source image for its maximum angular distance. For the second state, the animation may be achieved by choosing a high value for p_(t,i) such that the presence of the target image cannot be noticed by the user (e.g. by choosing an area not visible on the user's display). Then the process for zooming is the same. In yet another embodiment, the 'hole' may take any shape and may be provided as input to a Mobius transformation zooming function (e.g., not the form of $z→z^{'}$), as is done in FIGS. 4A-4C in which the boundary 412 may represent the hole's boundary and move when the hole grows.

In general, when panoramic images sampled from a panoramic video are used as source sphere and target sphere, the source image and the target image may be, and preferably are selected such that their timelines are synchronized.

When using multiple layered spherical images, a transition effect may be achieved by starting with a zoomed-out target image. The animation may be constructed by synchronizing the zooming operation on all layers. Every image on one particular layer (the source image being on the top layer) may have a transparent cutout where the image on the next layer is visible. By definition, an infinite number of layers may be used, but taking into account restrictions in computational power, the number of layers may be limited to a preset number or to a dynamic number.

To enable another user (henceforth also simply referred to as 'observing user') to perceive that a user switches to another viewing position (henceforth also simply referred to as 'transitioning user'), transition data may be generated which may be indicative of the switching by the transitioning user to the second viewing position and which may enable a processor system of the observing user to establish, in said processor system's rendering of the virtual environment, a representation of the transition of the transitioning user to the second viewing position.

The transition data is also further discussed with reference to FIG. 7 and others, while FIGS. 6 and 8-10 and others describe how such transition data may be generated by a first processor system (e.g., of the transitioning user) and transmitted to and subsequently used by a second processor system (e.g., of the observing user). The following also includes a continued reference to the FIGS. 3A-3B example.

In general, the transition may use one or more mathematical functions, which may be expressed in the spherical and/or cartesian coordinate systems. Examples of effects which may be created using such functions are rotating, stretching, and/or zooming of panoramic images. Such effects may be selected or combined to convey the transitioning user with the impression of transitioning between panoramic images. Given that images are typically represented by a discrete number of pixels, such transformations may lack image data in the continuous spherical domain, which may be addressed by interpolation or smoothing algorithms. On a more abstract level, a transformation between panoramic images may be defined as a mapping from a 2D image to a new 2D image, which may be comprised of multiple separate mappings to the 2D continuous spherical domain, 3D space, and back to the discrete image domain. A specialized kind of transformation applied to omnidirectional images are those who take place in 2D complex space and Mobius transformations.

Image transformations may be well-suited for implementing animations as the progress of transformation may be determined as a function of time. Examples of such image transformations are fading effects, gradually sampling pixels from the second panoramic image, blurring, unwrapping the second panoramic image, or a combination of such effects. It is also possible to use more than two panoramic images as input to the mathematical transformation. For example, a transition may be generated to the second panoramic image via an intermediate panoramic image.

Figure 5B:
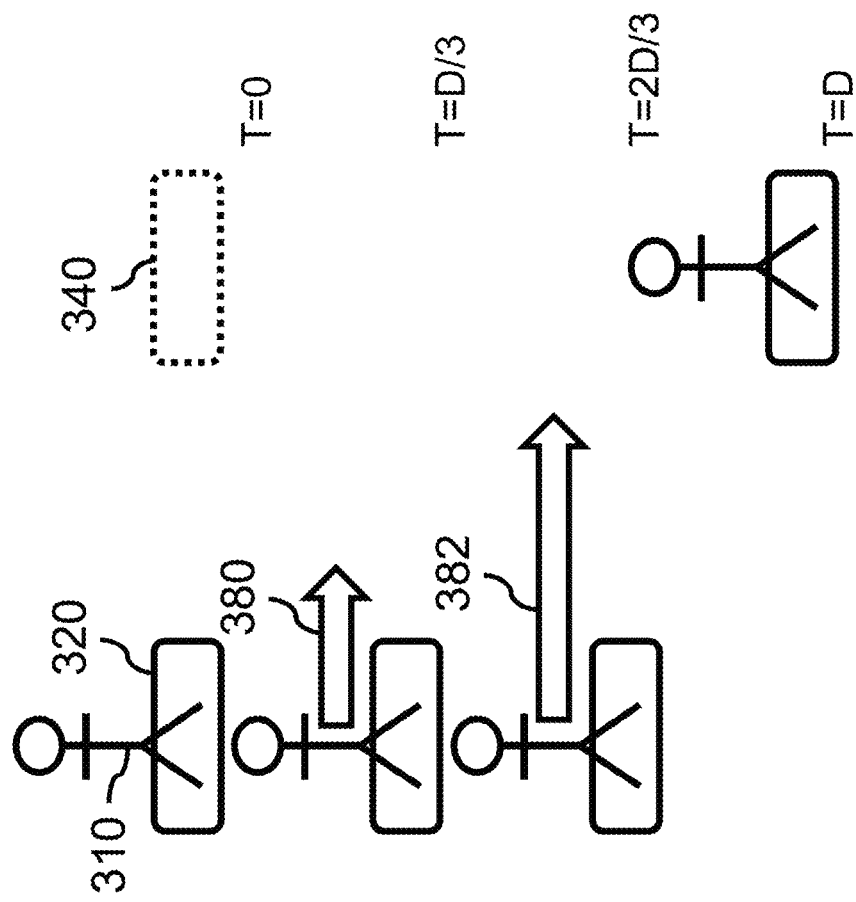
FIG. 5B illustrates an animation of an arrow, which may be generated using the transition data as a visual representation of the transition.
Figure 5A:
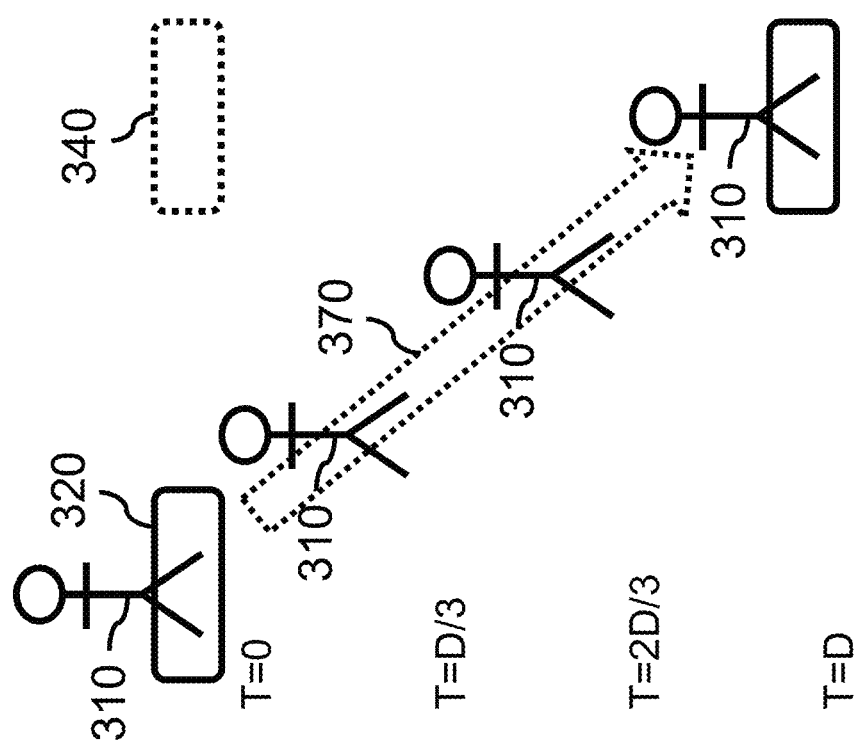
FIG. 5A illustrates a movement of an avatar of a user, which may be generated using the transition data as a visual representation of the transition.

FIGS. 5A-5B show two examples of how the second processor system may establish a representation of the transition of the transitioning user to the second viewing position in the virtual environment. In both figures, the vertical axis corresponds to a time axis in which T=0 may correspond a particular moment in time and T=D may correspond to a later moment in time at which an amount of time expressed by the value of D has elapsed. For example, the value of D may at least coarsely correspond to a time duration of the transition rendered to the transitioning user. A specific yet arbitrary example may be that D may be 800 msec. FIGS. 5A-5B further show the avatar 310 of the transitioning user, the first viewing position 320 and the second viewing position 340 in the virtual environment. FIG. 5A shows a first example of how the transition of the transitioning user may be represented in the virtual environment to be perceivable by an observing user. Namely, the avatar 310 of the transitioning user is shown to be moved along a movement trajectory 370 from the first viewing position 320 to the second viewing position 340. Such a movement trajectory 370 may be determined from the transition data in various ways as the transition data may at least indicate the second viewing position 340. For example, the movement trajectory 370 may be determined as a series of intermediate positions for the avatar 310 by linear interpolation between the coordinates of the first viewing position and the second viewing position as a function of time. Various other ways of determining a movement trajectory are equally possible, and may differ in type (e.g., linear or non-linear), definition (e.g., predefined as a series of coordinates, or defined by 'higher-level' parameters such as parameters of a function which defines the trajectory), etc.

FIG. 5B shows another example of how the second processor system may establish a representation of the transition of the transitioning user to the second viewing position in the virtual environment. Namely, in this example, an animated arrow 380, 382 is shown which points in the direction of the second viewing position 340 and which length increases so as to convey a progress of the transition to the second viewing position. Various other animations are equally conceivable, and may be used instead of, or in addition to, a movement of the avatar 310 of the transitioning user.

Figure 6:
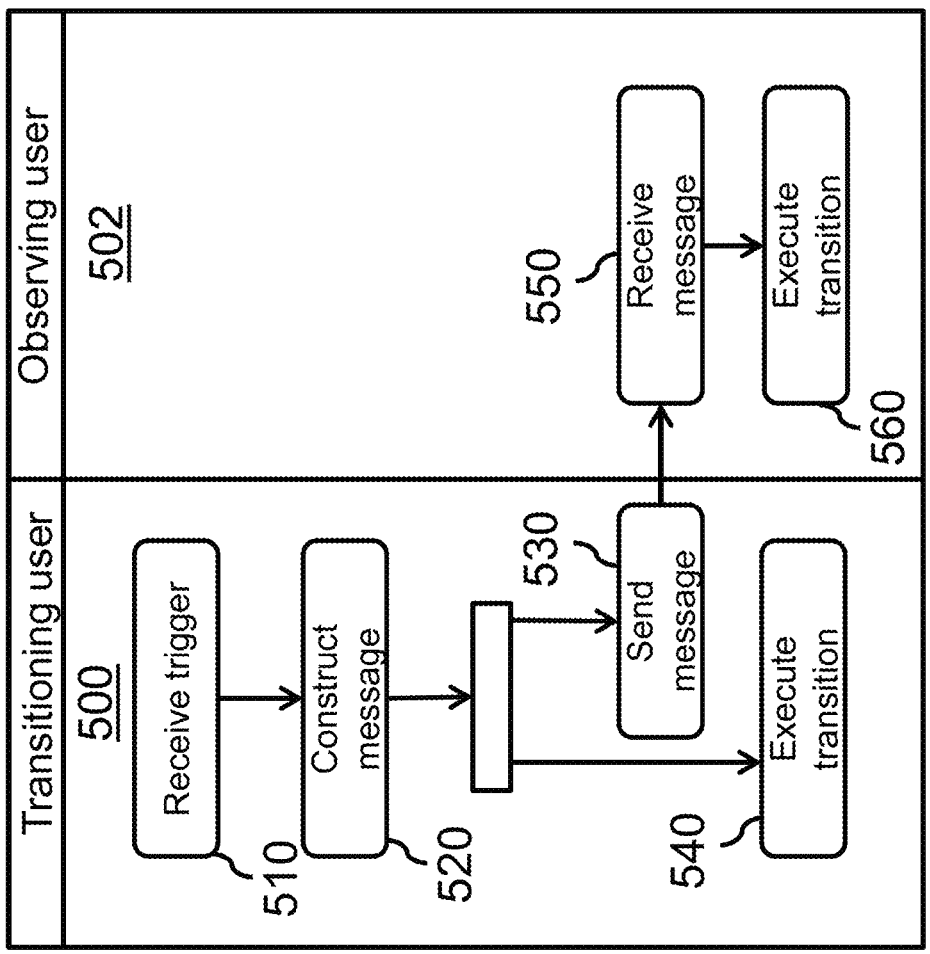
FIG. 6 shows a messaging from a processor system of a transitioning user to a processor system of an observing user.
Figure 8:
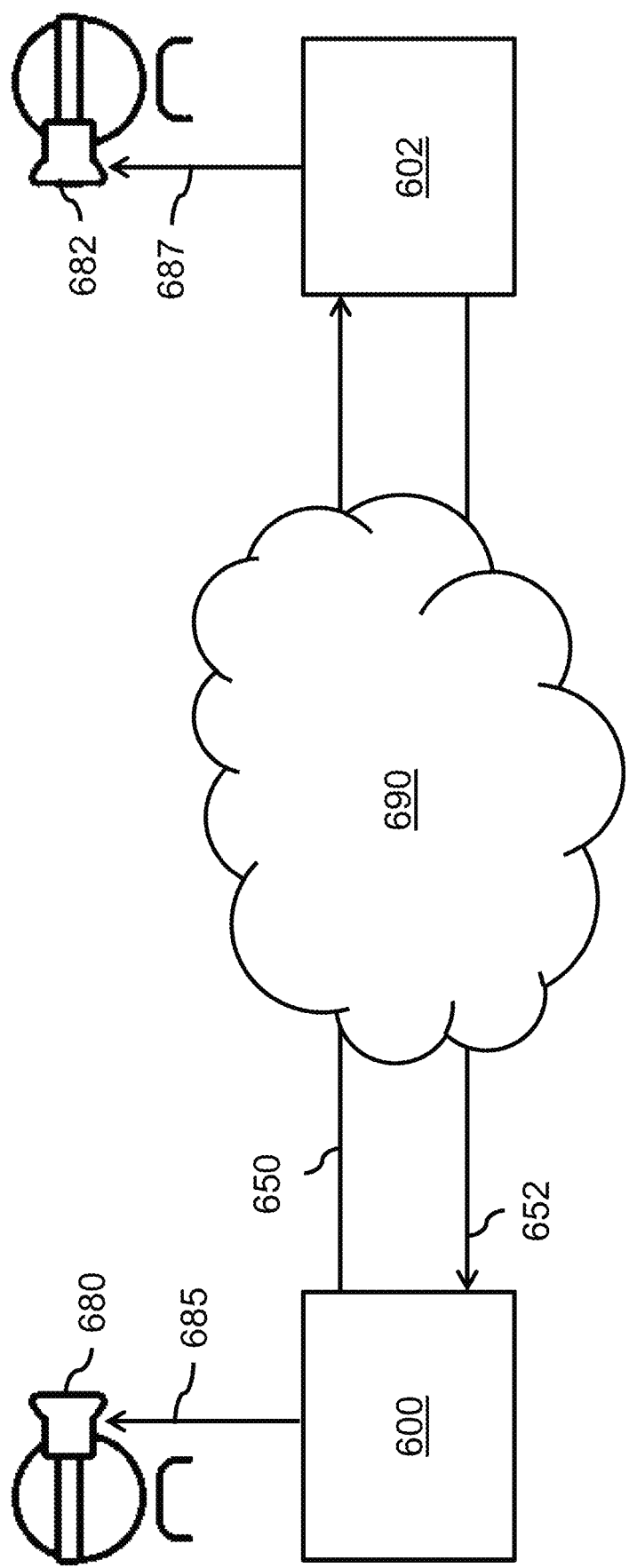
FIG. 8 shows data communication between two processor systems which are each configured for rendering a virtual environment having a number of viewing positions for which different panoramic images are available, and for rendering a visual representation of a transition between panoramic images which is rendered by, and using transition data received from, the other processor system.
Figure 9:
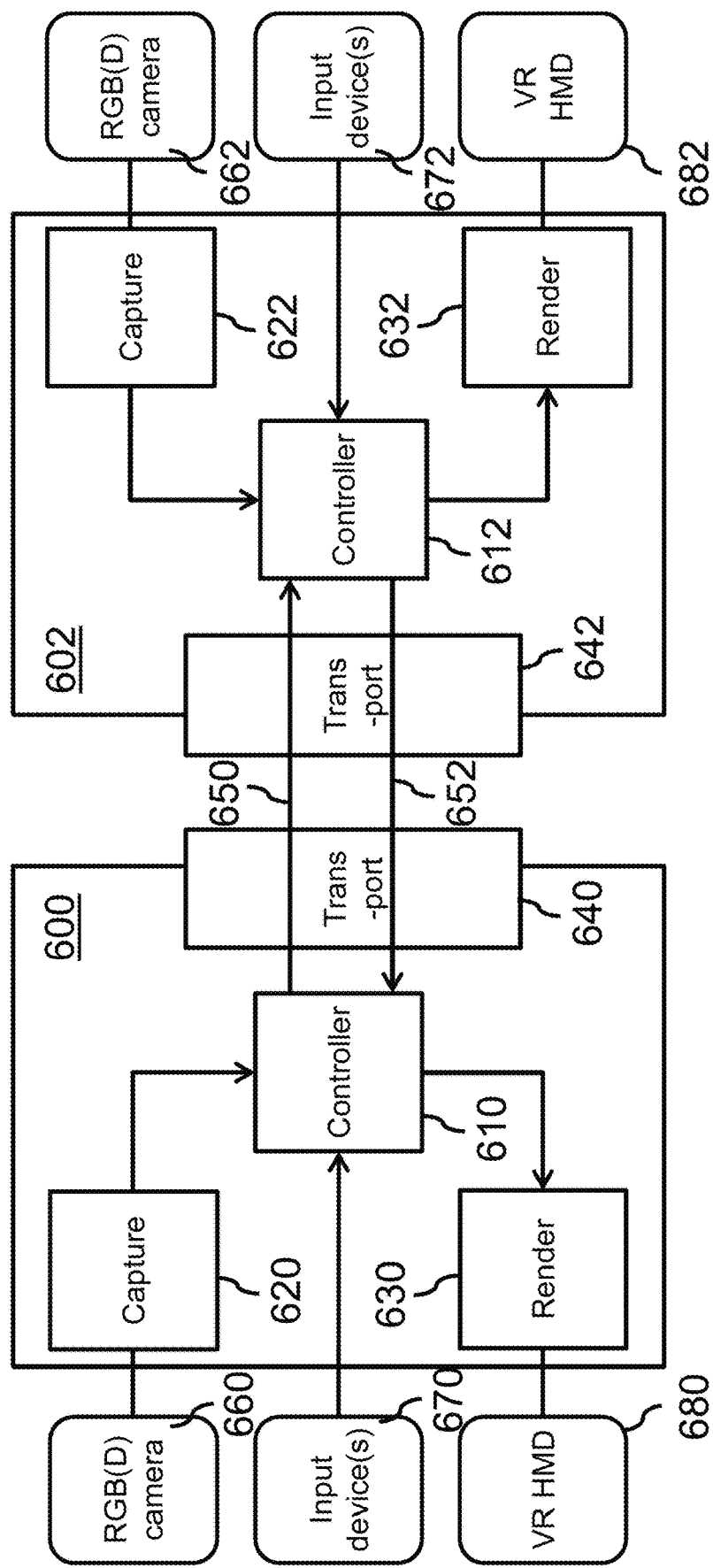
FIG. 9 shows a schematic overview of internal functions of the processor systems of FIG. 8 and shows peripherals connected to the processor systems.

FIG. 6 shows a messaging from the (first) processor system of the transitioning user 500 to the (second) processor system of the observing user 502, with the exception that the processor systems themselves are not shown in FIG. 6 but rather in FIGS. 8 and 9. Here, steps performed at the processor system of the transitioning user are shown at the left-hand side ("Transitioning user", reference numeral 500), and steps performed at the processor system of the observing user are shown at the right-hand side ("Observing user", reference number 502). The messaging may be based on a trigger being received in step 510 "Receive trigger", which may for example be a user input or a timer. By way of the trigger, the destination may be determined, being a second viewing position and possibly a viewing orientation at the second viewing position. A message may then be constructed in step 520 "Construct message" which may indicate the transition, in that it may at least indicate the second viewing position. Effectively, the message may comprise or represent what is elsewhere referred to as 'transition data'. The message may then be transmitted in step 530 "Send message" to the processor system of the observing user 502, and if there are multiple observing users, to multiple of such processor systems. At the side of the observing user 502, the message may be received in a step "Receive message". At both sides, e.g., at the transitioning user 500 and at the observing user 502, the transition may be executed in respective steps 540, 560 "Execute transition". At the side of the transitioning user 500, this may comprise rendering the transition, e.g., as a Mobius transformation between panoramic images. At the side of the observing user 502, this may comprise rendering a visual representation of the transition in the virtual environment using the information contained in the received message. Such execution may be synchronized, for example by there being an explicit synchronization mechanism. In some embodiments, e.g., in which there is little latency between the processor systems of the respective users 500, 502, there may be no need for a synchronization mechanism and instead a receipt of the message at step 550 may denote that the transition may be directly executed.

As previously indicated, the execution of the transition at step 540 may comprise a transition being rendered from one panoramic image to a second panoramic image, for example using a Mobius transformation. In some embodiments, the audio rendering of the visual environment and/or the visual rendering of other elements in the virtual environment may be matched to the transition experienced by the transitioning user. Here, 'other' may refer to elements other than the panoramic image(s), and may include graphical objects, avatars of other users and the like. The audio rendering may comprise rendering spatial audio sources, such as virtual loudspeakers representing other users. Said matching may be performed by adjusting the viewing position and/or viewing orientation of the transitioning user in accordance with a movement trajectory which may be determined to represent the transition experienced by the transitioning user. The movement trajectory may be the same movement trajectory as may be used by the processor system of the observing user to render the visual representation of the transition, and may be determined in a same or similar manner, e.g., based on the transition data or similar data. The adjusted viewing position and/or adjusted viewing orientation may then be used to render the auditive and visual parts of the virtual environment to the transitioning user, in which the visual parts may be rendered as an overlay to the rendering of the transition itself.

The execution of the transition at step 560 is also described elsewhere. In a specific example, the transitioning user may be represented by a video avatar, e.g., by a video on a plane in the virtual environment. To render a visual representation of the transition of the transitioning user to the destination viewing position, the plane may be moved through the virtual environment and rotated to keep facing the observing user.

With joint reference to FIGS. 3A-3B and FIG. 6, the message sent at step 530 may for example indicate that user 1 may move from one coordinate to another, e.g., from (−2, −2) to (1, −3), or at least contain the destination coordinate, e.g., (1, −3). Such coordinates may be expressed in various ways, for example directly in a coordinate system of the virtual environment or in another coordinate system of which the relation to the coordinate system of the virtual environment is known. While moving, the viewing orientation of the user 1 may also be changed, e.g., because it may be desirable to have seated users facing the display 360 and to have a presenting user facing the seated users. In the example of FIGS. 3A-3B, user 1 may have a viewing orientation of 80 degrees in the first viewing position 320, which may be change to 320 degrees when repositioned to the second viewing position 340. In this respect, it is noted that the viewing position and viewing orientation may be expressed as 3D vectors for a 3D virtual environment, or in any other suitable manner.

With continued reference to FIGS. 3A-3B, the transition may take a certain duration, such as 3 seconds, to complete. For the observing user, it may be desirable to render a visual representation of the transition which starts and ends approximately at the same time as the transition is rendered to the transitioning user, thereby having an approximately same length. For example, the avatar 310 of the transitioning user may be moved along a movement trajectory, with the position of the avatar 310, and in some embodiments the orientation of the avatar's body (and/or the avatar's head) being adjusted continuously or at least periodically during the 3 seconds. In some embodiments, for example in those in which the avatar is a so-called video avatar, the video plane of the avatar may be adjusted to continuously face the observing user. It is noted that although the transitioning user is presented with a transition, the viewing position and/or viewing orientation of the transitioning user may also be adjusted in accordance with the movement trajectory, e.g., to gradually adjust other elements in the virtual environment to their expected position in the virtual environment when the user assumes the second viewing position and possible second viewing orientation.

When using a coordinate system such as the one of FIGS. 3A-3B, intermediate viewing positions and viewing orientations may be calculated by interpolation. As such, it may be determined that at ⅓ of the duration of the transition, e.g., at 1 second, the viewing position (X, Y) and viewing orientation (e.g., $\phi$) may be expressed as the vector (X, Y, $\phi$)=(−1, −2.33, 40°) on the basis of the repositioning along the X-axis being from −2 to 1 and thus +3 unit, thereby equaling 1 unit per second, on the Y-axis being from −2 to −3 and thus −1 unit, thereby equaling −0.33 unit per second, and the orientation changing from 80° to 320° (counter-clockwise) thereby equaling a change of 40° per second. Likewise, it may be calculated that at ⅔ of the duration of the transition, e.g., at 2 seconds, (X, Y, $\phi$)=(0, −2.66, 0°).

Figure 7:
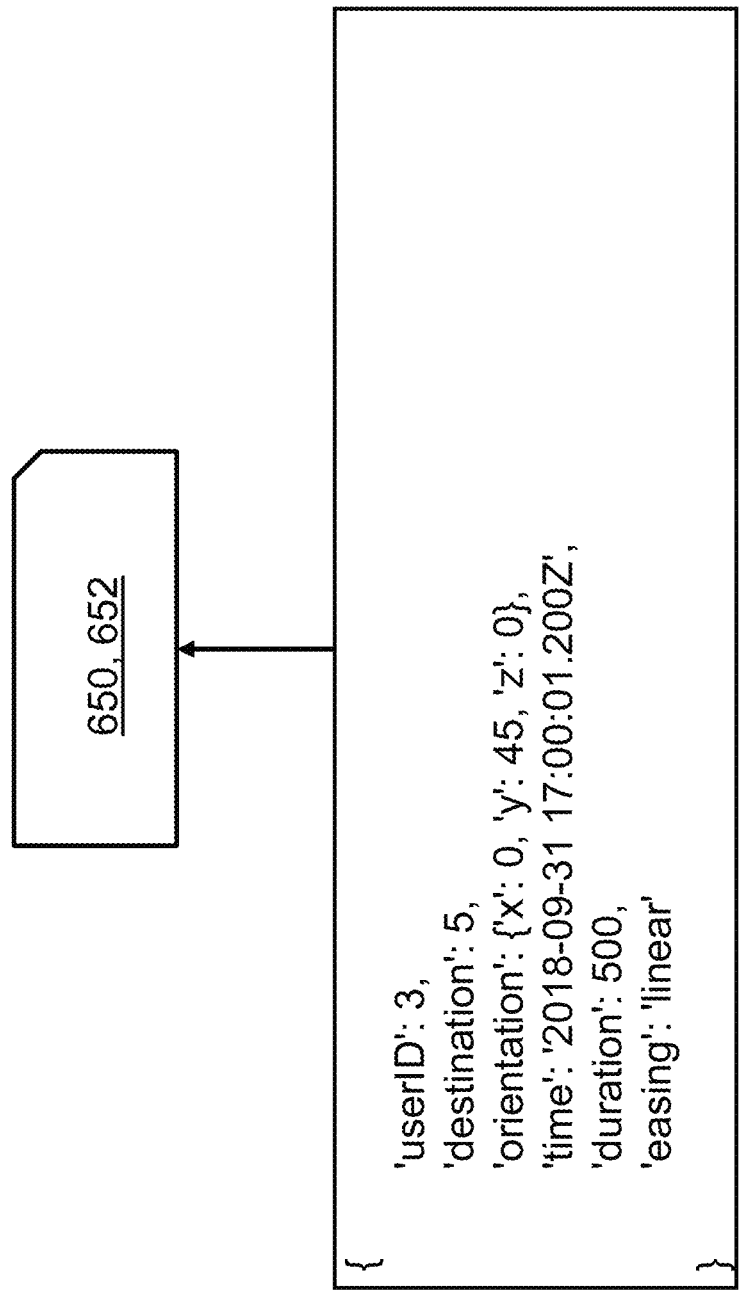
FIG. 7 shows an example of transition data.

FIG. 7 shows an example of transition data 650, 652, which is also in FIGS. 8 and 9 referred to by the same reference numerals, and which may for example be formatted in the so-called JSON format. The transition data may, in this example and in general, comprise a user identifier (e.g., 'userID') which may identify the transitioning user and which may take various forms such as an index (e.g., '3') or a unique string. It will be appreciated that the user identifier may be omitted in case there are only two users. The transition data may also comprise an indication of the destination viewing position (e.g., 'destination'), which may take various forms such as a coordinate or index (e.g., '5') of a set of predetermined viewing positions. In the former case, the coordinate system may be assumed to be known and shared between all parties. In the latter case, the set of predetermined viewing positions may be assumed to be known and shared between all parties. The transition data may also comprise an orientation defining a viewing orientation of the transitioning user at the end of the transition (e.g., 'orientation'). This orientation may pertain to the transitioning user, or more specifically its avatar, and may indicate or define the orientation of the avatar itself (e.g., when looking straight ahead). In this respect, it is noted that the orientation of the avatar's head relative to its body may be described as a rotation which may be separately indicated or defined. In some embodiments, the transition data may define a series of orientations which define the orientation of the avatar during the transition.

The transition data may also comprise a time indication (e.g., 'time') at which the transition is scheduled to be rendered. This may indicate at which time the visual representation of the transition is to be rendered to be in (approximate) synchronicity with the transition itself. Possible ways of providing a time indication may include the following. For example, the value 'immediately' may execute the transition as soon as possible, which may also be a default value or behavior if the time indication is not included in the transition data. A timestamp, e.g., '2018-09-31 17:00:01.200Z', may execute the transition at the specified time, and may be well-suited when synchronized clocks are used between the processor system of the transitioning user and the processor system of the observing user. A time offset may execute the transition after a specified time, e.g., a number of milliseconds. This may be used when the latency of the network via which the transition data may be sent is known or may be measured or estimated. It is noted that the transition may be scheduled taking into account network latency, such that each entity receiving the transition data may timely render the visual representation of the transition. The transition data may also comprise a duration (e.g. 'duration') which may indicate a duration of the transition (e.g. '500', which may denote 500 ms). The transition data may also comprise a parameter defining a timing function (e.g., 'easing') which may indicate how the speed of the rendering of the visual representation of the transition is to be varied over the duration. Examples of possible values are 'linear', 'ease-in', 'ease-out', 'ease-in-out', and 'stepwise'. In general, the transition data may comprise an indication of the destination viewing position and one or more of the above parameters.

Figure 10:
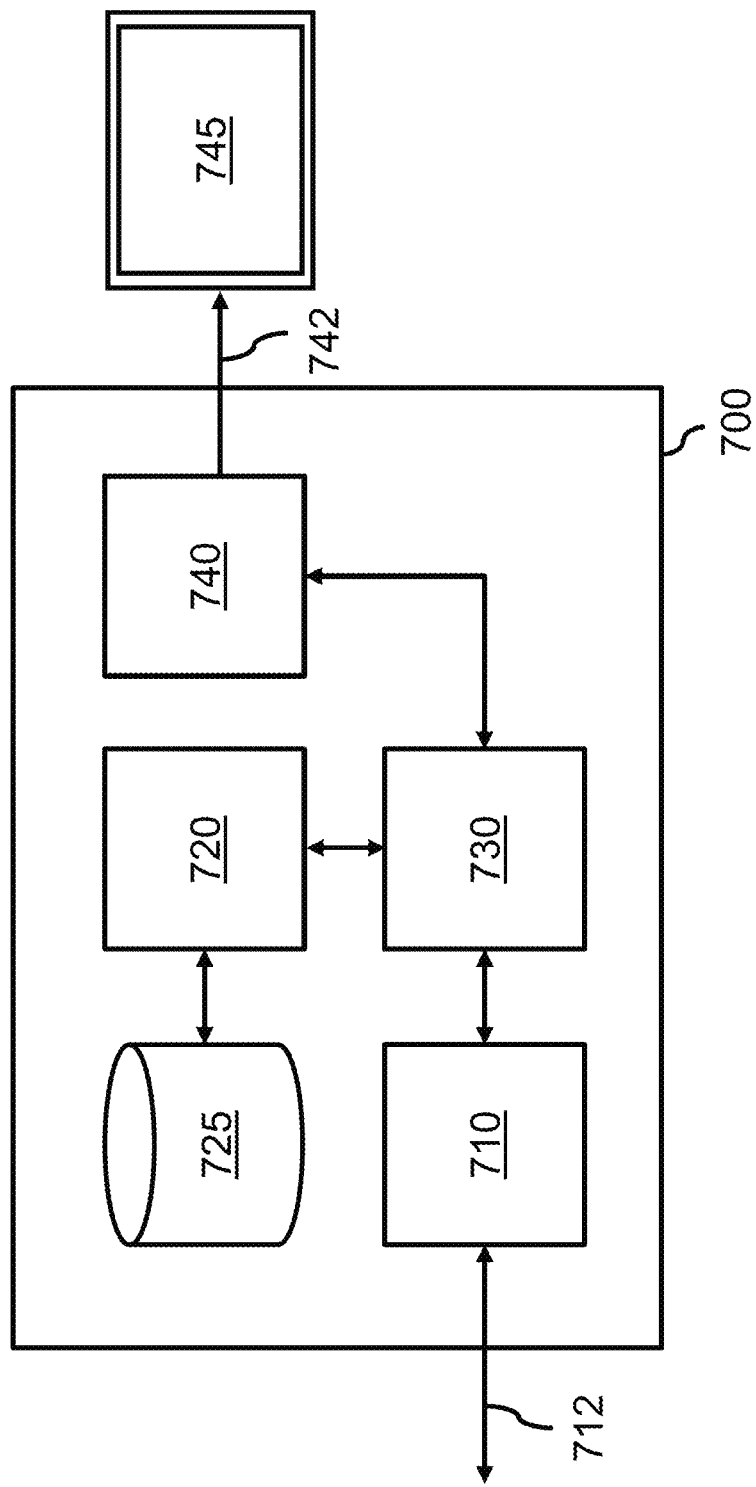
FIG. 10 shows a processor system for rendering at least part of a multiuser virtual environment which is configured for generating or using transition data.

FIGS. 8-10 relate to the processor system of the transitioning user and/or to the processor system of the observing user. Both processor systems are in the following described to be instances of a processor system which includes the functionality described elsewhere with reference to the processor system of the transitioning user and that of the processor system of the observing user. Thereby, when a role of the user changes, e.g., from transitioning user to observing user, e.g., of another user which is transitioning to another viewing position, different functionality of the processor system may be invoked, e.g., from the functionality described for the transitioning user's processor system to the functionality described for the observing user's processor system. However, the above is not a limitation, in that in some embodiments, both processor systems may be differently configured. For example, it may not be needed for the processor system of the observing user to be configured to render panoramic images and/or transitions between panoramic images, but rather it may suffice to render a representation of a transition based on received transition data.

FIG. 8 shows data communication between a processor system 600 and a processor system 602. Each processor system 600, 602 may be configured to render a transition between panoramic images and to generate and output transition data 650, 652 which is indicative of said transition, and when receiving such transition data 650, 652, to render a visual representation of such a transition in the virtual environment. In the example of FIG. 8, both processor systems 600, 602 are shown to render the virtual environment to a user in VR, namely by generating and outputting display data 685, 687 to an HMD 680, 682. Both processor systems 600, 602 are shown to communicate with each other via a network 690, such as the Internet, a Local Area Network (LAN) or a Personal Area Network (PAN), e.g., using a Bluetooth or Zigbee connection. Alternatively, another communication interface may be used, such as a serial bus.

FIG. 9 shows a schematic overview of internal functions of the processor systems 600, 602 of FIG. 8 and shows peripherals which may be connected to the processor systems. It is noted that FIG. 9 shows the processor systems 600, 602 communicating directly with each other. When more processor systems are involved, e.g., as clients of a multiuser virtual environment, an orchestrator or message broker server may be used to handle or coordinate communication between such clients. In each processor system 600, 602, a controller 610, 612 may be provided to receive a transition trigger, e.g. via an input device 670, 672 or via a timer. The controller 610, 612 may construct a message 650, 652 containing or representing the transition data and may send said message to the other processor system via a transport function 640, 642. The controller 610, 612 may further generate rendering commands for a renderer 630, 632 to render the transition. In turn, when receiving such a message via the transport function 640, 642, the controller 610, 612 may translate the transition data into rendering commands for the renderer 630, 632 to render a visual representation of the transition. In addition, each processor system 600, 602 may be configured to capture a video of a user using an RGB(D) camera 660, 662 and a capturer 620, 622. Such video may be processed, e.g., for background removal, and then transmitted, e.g., as a video stream, to the other processor system for display in the virtual environment, e.g., as a video avatar. Each user may then view the virtual environment, including the other user's video avatar, e.g., using a VR HMD 680, 682, and in some embodiments may manually control aspects of the virtual environment or its rendering using input device(s) 670, 672. Each function of the processor systems 600, 602, e.g., the controller 610, 612, the capturer 620, 622, the renderer 630, 632, and the transport function 640, 642 may be embodied by respective hardware circuits or software functions, e.g., a processor for the controller, a capture interface for the capturer, a graphics processor for the renderer, and a communication interface for the transport function. Alternatively, these functions may be implemented as described for FIG. 10.

FIG. 10 shows a processor system 700 representing a processor system of the transitioning user or a processor system of the observing user, or both. The processor system 700 is shown to comprise a processor 730 which may be configured, e.g., by hardware design or software, to perform operations described elsewhere pertaining to i) the rendering of the transition and the generating of the transition data, or ii) the rendering of the representation of the transition using the transition data, or both. For example, the processor 730 may be embodied by a single Central Processing Unit (CPU), but also by a combination or system of such CPUs and/or other types of processing units, such as Graphics Processing Units (GPUs). The processor system 700 is further shown to comprise an input interface 720 for accessing a data storage 725, which may for example be internal memory, a hard disk, a solid-state drive, or an array thereof, and which may be used to store or buffer data such as panoramic images. In other embodiments, the input interface 720 may be an external interface, such as an external storage interface to an external data storage or a network interface. FIG. 10 further shows the processor system 700 to comprise a communication interface 710, which may be any suitable type of communication interface via which transition data may be transmitted and/or received, with in general such data communication being indicated by reference numeral 712. For example, the communication interface 710 may be a network interface, which in turn may be a wireless network interface, e.g., based on Wi-Fi, Bluetooth, ZigBee, 4G or 5G mobile communication, or a wired network interface, e.g., based on Ethernet or optical fiber. For example, the network interface 710 may be a local area network (LAN) network interface or an interface to wide area network (WAN) such as the Internet. In some embodiments, the input interface 720 and the communication interface 710 may be the same interface, e.g., a network interface. In some embodiments, the processor 730 may directly generate and output display data 742 to a display 745 such as an HMD. In other embodiments, the processor 730 may output rendered image data which may be output as display data 742 to the display 745 by a separate display output 740.

In general, each of the processor systems 600, 602, 700 of FIGS. 8-10 may be embodied by a (single) device or apparatus. For example, each respective processor system may be embodied as smartphone, personal computer, laptop, tablet device, gaming console, set-top box, television, monitor, projector, smart watch, smart glasses, media player, media recorder, head mounted display device, etc. Each respective processor system may also be embodied by a distributed system of such devices or apparatuses. An example of the latter may be the functionality of the processor system distributed at least in part over network elements in a network.

In general, each of the processor systems 600, 602, 700 of FIGS. 8-10 may be embodied as, or in, a device or apparatus. The device or apparatus may comprise one or more (micro) processors which execute appropriate software. The processors of each respective system may be embodied by one or more of these (micro)processors. Software implementing the functionality of a respective system may have been downloaded and/or stored in a corresponding memory or memories, e.g., in volatile memory such as RAM or in non-volatile memory such as Flash. Alternatively, the processors of a respective system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of a respective system may be implemented in the form of a circuit. It is noted that a respective system may also be implemented in a distributed manner, e.g., involving different devices.

Figure 11:
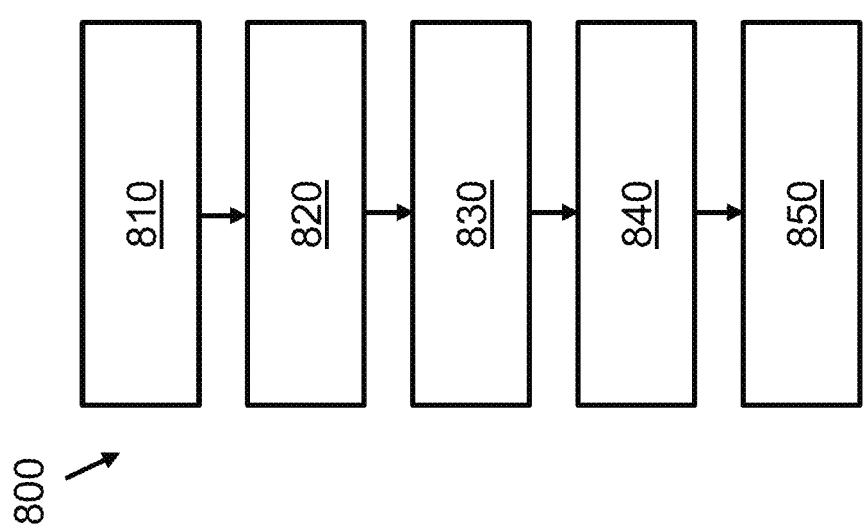
FIG. 11 shows a method for rendering a transition between panoramic images and for generating transition data being indicative of said transition.

FIG. 11 shows a computer-implemented method 800 for rendering a multiuser virtual environment. The method 800 may comprise, in an operation titled "ACCESSING PANORAMIC IMAGES, METADATA", accessing 810 at least two panoramic images, each of the panoramic images representing a different image-based background for the virtual environment and metadata defining viewing positions in the virtual environment for which viewing positions respective panoramic images are to be rendered when a respective viewing position in the virtual environment is selected. The method 800 may further comprise, in an operation titled "RENDERING FIRST PANORAMIC IMAGE", for a first viewing position, rendering 820 a first panoramic image. The method 800 may further comprise, in an operation titled "RENDERING TRANSITION TO SECOND PANORAMIC IMAGE", in response to a selection of a second viewing position, rendering 850 a transition in the virtual environment to the second viewing position using the metadata, and at completion of said rendering of the transition, rendering the second panoramic image for the second viewing position. The method 800 may further comprise, in an operation titled "GENERATING TRANSITION DATA", using the metadata, generating 830 transition data indicative of the transition to the second viewing position. The method 800 may further comprise, in an operation titled "OUTPUTTING TRANSITION DATA", outputting 840 the transition data to enable a remote entity which renders at least part of the multiuser virtual environment to establish, in the remote entity's rendering of the virtual environment, a representation of the transition to the second viewing position.

Figure 12:
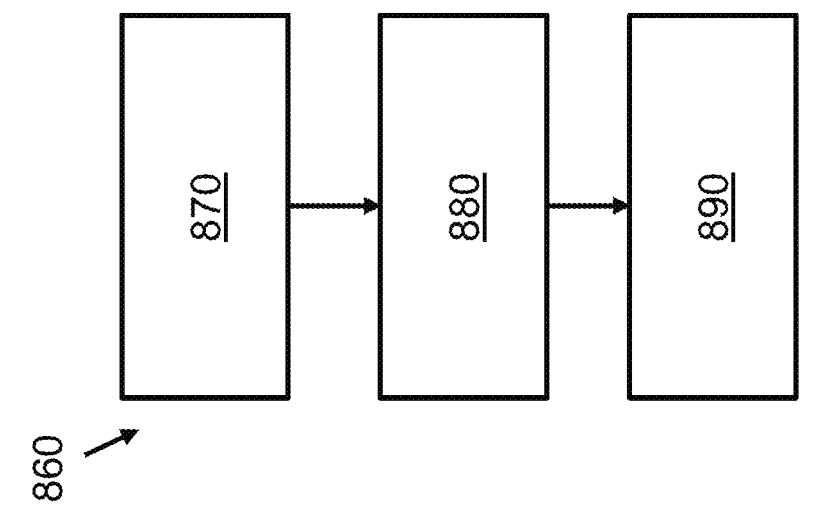
FIG. 12 shows a method for rendering a visual representation of the transition between panoramic images using the transition data.

FIG. 12 shows a computer-implemented method 860 for rendering a multiuser virtual environment. The method 860 may comprise, in an operation titled "RENDERING REPRESENTATION OF FIRST VIEWING POSITION", rendering 870 at least part of the virtual environment, said rendering comprising rendering a representation of a first viewing position in the virtual environment from which the virtual environment is rendered by a remote entity. The method 860 may further comprise, in an operation titled "RECEIVING TRANSITION DATA", receiving 880 transition data which is indicative of a transition by the remote entity to a second viewing position in the virtual environment from which the virtual environment is rendered. The method 860 may further comprise, in an operation titled "RENDERING REPRESENTATION OF TRANSITION TO SECOND VIEWING POSITION", using the transition data, establishing 890 a representation of the transition to the second viewing position in the virtual environment.

It will be appreciated that, in general, the operations of method 800 of FIG. 11 and/or method 860 of FIG. 12 may be performed in any suitable order, e.g., consecutively, simultaneously, or a combination thereof, subject to, where applicable, a particular order being necessitated, e.g., by input/output relations. In particular, in the method 800 of FIG. 11, the operations of reference numerals 830, 840 may be performed before or simultaneously with the operation of reference numeral 850.

Figure 13:
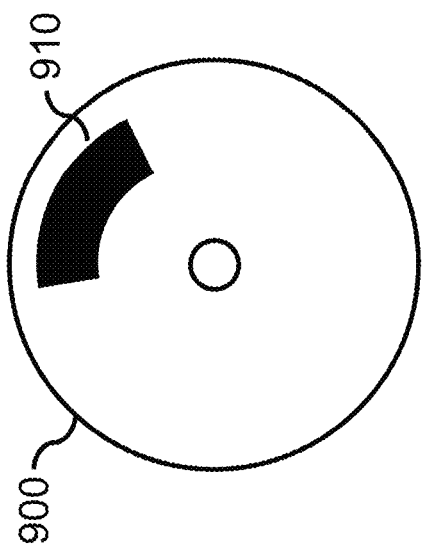
FIG. 13 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 900 as for example shown in FIG. 13, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 13 shows by way of example an optical storage device 900.

In an alternative embodiment of the computer readable medium 900 of FIG. 13, the computer readable medium 900 may comprise transitory or non-transitory data 910 represent the transition data or message described in this specification.

FIG. 14 is a block diagram illustrating an exemplary data processing system 1000 that may be used in the embodiments described in this specification. Such data processing systems include data processing entities described in this specification, including but not limited to the first, second and other processor systems and client devices as described with reference to FIGS. 1-10 and elsewhere, and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 14, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a processor system of a transitioning user or the 'first' processor system. In that case, application 1018 may represent an application that, when executed, configures data processing system 1000 to perform the functions described with reference to said entity. In another example, data processing system 1000 may represent a processor system of an observing user or the 'second' processor system. In that case, application 1018 may represent an application that, when executed, configures data processing system 1000 to perform the functions described with reference to said entity.

In accordance with an abstract of the present specification, processor systems and computer-implemented methods may be provided for rendering a multiuser virtual environment in which different panoramic images may be provided as image-based backdrop for different viewing positions in the virtual environment. When a user switches from a first viewing position for which a first panoramic image is rendered to a second viewing position for which a second panoramic image is rendered, a transition may be rendered for the user, for example as a mathematical transformation of the panoramic images. To avoid other users perceiving the representation of the user in the virtual environment from abruptly switching to the second viewing position, transition data may be provided which may enable another processor system to render a representation of the transition in the virtual environment, e.g., by moving an avatar of the user along a movement trajectory.

In the claims, any reference signs placed between parentheses shall not be construed as limiting the claim. Use of the verb "comprise" and its conjugations does not exclude the presence of elements or steps other than those stated in a claim. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

REFERENCES

[1] "Squares that Look Round: Transforming Spherical Images" by Saul Schleimer and Henry Segerman, arXiv: 1605.01396
[2] https://en.wikipedia.org/wiki/List_of_common_coordinate_transformations#To_spherical_coordinates The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:
1. A processor system for rendering a multiuser virtual environment for a first user, the processor system comprising:
  a communication interface;
  an input interface for accessing:
    at least two panoramic images, each of the panoramic images representing a different image-based background for the virtual environment for the first user for a different viewing position for the first user in the virtual environment;
    metadata defining viewing positions and viewing orientations of the first user in the virtual environment for which viewing positions respective panoramic images for the first user are to be rendered when a respective viewing position and a respective viewing orientation in the virtual environment is selected;
  a processor configured to:
    for a first viewing position and a first viewing orientation of the first user, render a first panoramic image;
    in response to a selection of a second viewing position and a second viewing orientation of the first user, render a transition in the virtual environment for the first user to the second viewing position using the metadata, and at completion of said rendering of the transition, render the second panoramic image for the second viewing position and the second viewing orientation;
    using the metadata, generate transition data indicative of the transition to the second viewing position and the second viewing orientation, wherein the transition data comprises at least one of:
      destination data defining at least the second viewing position; and
      trajectory data defining at least part of a non-linear trajectory of the first user from the first viewing position to the second viewing position;
    via the communication interface, output the transition data to enable another processor system which renders at least part of the multiuser virtual environment for a second user to establish, in the other processor system's rendering of the virtual environment for the second user, an animated visual or video representation of the transition of the first user moving from the first viewing position and the first viewing orientation to the second viewing position and the second viewing orientation.

2. The processor system according to claim 1, wherein the processor is configured to generate the transition data to further comprise at least one of:
  duration data defining a time duration of the transition; and
  orientation data defining an orientation of a virtual camera which is used in the rendering of the virtual environment during or at an end of the transition.

3. The processor system according to claim 1, wherein the processor is configured to generate the transition data to comprise timing data defining when the transition is rendered, or is scheduled to be rendered, by the processor system.

4. The processor system according to claim 1, wherein the processor is configured to output the transition data before rendering the transition.

5. The processor system according to claim 1, wherein the processor is configured to render the transition using a mathematical transformation of the first panoramic image to the second panoramic image.

6. The processor system according to claim 5, wherein the mathematical transformation is a spherical image transformation.

7. The processor system according to claim 6, wherein the spherical image transformation is based on a Möbius transformation.

8. The processor system according to claim 1, wherein the processor is configured to generate the transition data as real-time or near real-time data which is indicative of a current progress in the transition to the second viewing position.

9. A processor system for rendering a multiuser virtual environment for a second user, the processor system comprising:

a communication interface;
a processor configured to:
when rendering at least part of the virtual environment for the second user, rendering a representation of a first viewing position and a first viewing orientation of a first user in the virtual environment from which first viewing position and first viewing orientation the virtual environment is rendered by another processor system for the first user;
via the communication interface, receive transition data which is indicative of a transition by the other processor system to a second viewing position and a second viewing orientation of the first user in the virtual environment from which second viewing position and second viewing orientation the virtual environment is rendered for the first user and wherein the other processor system renders a first panoramic image for the first viewing position and the first viewing orientation of the first user, and in response to a selection of the second viewing position and the second viewing orientation of the first user, renders a transition in the virtual environment for the first user to the second viewing position and at completion of said rendering of the transition, renders a second panoramic image for the second viewing position and the second viewing orientation of the first user, the first panoramic image and the second panoramic image each representing a different image-based background for the virtual environment, wherein the transition data comprises at least one of:
destination data defining at least the second viewing position; and
trajectory data defining at least part of a non-linear trajectory from the first viewing position to the second viewing position; and
using the transition data, establish an animated visual or video representation of the transition of the first user moving from the first viewing position and the first viewing orientation to the second viewing position and the second viewing orientation in the virtual environment for the second user.

10. The processor system according to claim 9, wherein the transition data comprises duration data defining a time duration of the transition, and wherein the processor is configured to establish the representation of the transition as an animation or movement trajectory spanning the time duration.

11. The processor system according to claim 9, wherein the processor is configured to establish the representation of the first viewing position as a visual representation of a remote user, and to establish the transition as a movement trajectory of the visual representation of the remote user.

12. A computer-implemented method for rendering a multiuser virtual environment for a first user, the method comprising:
accessing:
metadata defining viewing positions and viewing orientations of the first user in the virtual environment for which viewing positions and viewing orientations respective panoramic images for the first user are to be rendered when a respective viewing position and a respective viewing orientation in the virtual environment is selected;
at least two panoramic images, each of the panoramic images representing a different image-based background for the virtual environment for the first user for a different viewing position in the virtual environment;
for a first viewing position and a first viewing orientation of the first user, rendering a first panoramic image;
in response to a selection of a second viewing position and a second viewing orientation of the first user, rendering a transition in the virtual environment for the first user to the second viewing position using the metadata, and at completion of said rendering of the transition, rendering the second panoramic image for the second viewing position and the second viewing orientation;
using the metadata, generating transition data indicative of the transition to the second viewing position and the second viewing orientation, wherein the transition data comprises at least one of:
destination data defining at least the second viewing position; and
trajectory data defining at least part of a non-linear trajectory from the first viewing position to the second viewing position; and
outputting the transition data to enable a remote entity which renders at least part of the multiuser virtual environment for a second user to establish, in the remote entity's rendering of the virtual environment for the second user, an animated visual or video representation of the transition of the first user from the first viewing position and the first orientation to the second viewing position and the second viewing orientation.

13. A computer-implemented method for rendering a multiuser virtual environment for a second user, the method comprising:
rendering at least part of the virtual environment for the second user, said rendering comprising rendering a representation of a first viewing position and a first viewing orientation of a first user in the virtual environment from which the virtual environment is rendered by a remote entity for the first user;
receiving transition data which is indicative of a transition by the remote entity to a second viewing position and a second viewing orientation of the first user in the virtual environment from which the virtual environment is rendered for the first user, and wherein the remote entity renders a first panoramic image for a first viewing position and a first viewing orientation of the first user, in response to a selection of the second viewing position and the second viewing orientation of the first user, renders a transition in the virtual environment for the first user to the second viewing position and at completion of said rendering of the transition, renders a second panoramic image for the second viewing position and the second viewing orientation of the first user, the first panoramic image and the second panoramic image each representing a different image-based background for the virtual environment, wherein the transition data comprises at least one of:
destination data defining at least the second viewing position; and
trajectory data defining at least part of a non-linear trajectory from the first viewing position to the second viewing position; and
using the transition data, establishing an animated visual or video representation of the transition of the first user from the first viewing position and the first viewing orientation to the second viewing position and the second viewing orientation in the virtual environment for the second user.

14. A non-transitory computer-readable medium comprising a computer program, the computer program comprising instructions for causing a processor system to perform the method according to claim 12.

15. A non-transitory computer-readable medium comprising a computer program, the computer program comprising instructions for causing a processor system to perform the method according to claim 13.

* * * * *

UNITED STATES PATENT AND TRADEMARK OFFICE
CERTIFICATE OF CORRECTION

PATENT NO. : 11,461,942 B2  
APPLICATION NO. : 16/712736  
DATED : October 4, 2022  
INVENTOR(S) : Hans Maarten Stokking et al.

Page 1 of 1

It is certified that error appears in the above-identified patent and that said Letters Patent is hereby corrected as shown below:

On the Title Page

Item (73) Assignees:, please delete:
"NEDERLANDSE ORGANISATIE VOOR TOEGEPAST-NATUURWETENSCHAPPELUK ONDERZOEK TNO"
And insert:
--NEDERLANDSE ORGANISATIE VOOR TOEGEPAST-NATUURWETENSCHAPPELIJK ONDERZOEK TNO--

Signed and Sealed this  
Twenty-second Day of November, 2022

Katherine Kelly Vidal  
*Director of the United States Patent and Trademark Office*